US011469798B2

(12) United States Patent
Pehlke

(10) Patent No.: US 11,469,798 B2
(45) **Date of Patent: *Oct. 11, 2022**

(54) APPARATUS AND METHODS FOR RADIO FREQUENCY FRONT-ENDS

(71) Applicant: Skyworks Solutions, Inc., Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,675

(22) Filed: Aug. 12, 2020

(65) Prior Publication Data

US 2021/0058124 A1 Feb. 25, 2021

Related U.S. Application Data

(63) Continuation of application No. 16/868,370, filed on May 6, 2020, now abandoned, which is a continuation (Continued)

(51) Int. Cl.

*H04B 7/06* (2006.01)
*H04B 7/0404* (2017.01)

(Continued)

(52) U.S. Cl.

CPC ......... *H04B 7/0604* (2013.01); *H04B 1/0057* (2013.01); *H04B 1/40* (2013.01);

(Continued)

(58) Field of Classification Search

CPC ...... H04B 7/0604; H04B 1/0057; H04B 1/40; H04B 7/0404; H04B 7/0413; H04B 7/022; H04B 7/0608; H04B 7/0825

See application file for complete search history.

(56) References Cited

U.S. PATENT DOCUMENTS 9,077,293 B2 * 7/2015 Wimpenny .......... H04B 7/0417
9,602,156 B2 3/2017 Wloczysiak (Continued)

FOREIGN PATENT DOCUMENTS

CN 102570027 A 7/2012
CN 103178358 A 6/2013

(Continued)

OTHER PUBLICATIONS

Pehlke, et al., U.S. Appl. No. 15/920,783, filed Mar. 14, 2018, Apparatus and Methods for Radio Frequency Front-Ends.

(Continued)

*Primary Examiner* — Vineeta S Panwalkar

(74) *Attorney, Agent, or Firm* — Knobbe, Martens, Olson & Bear, LLP

(57) ABSTRACT

Apparatus and methods for radio frequency front-ends are provided. In certain configurations, a radio frequency front-end includes ultrahigh band (UHB) transmit and receive modules employed for both transmission and reception of UHB signals via at least two primary antennas and at least two diversity antennas, thereby supporting both 4×4 receive MIMO and 4×4 transmit MIMO with respect to one or more UHB frequency bands, such as Band 42, Band 43, and/or Band 48. The radio frequency front-end can operate with carrier aggregation using one or more UHB carrier frequencies to provide flexibility in widening bandwidth for uplink and/or downlink communications.

20 Claims, 12 Drawing Sheets

Related U.S. Application Data of application No. 15/920,783, filed on Mar. 14, 2018, now Pat. No. 10,659,121.

(60) Provisional application No. 62/471,902, filed on Mar. 15, 2017.

(51) Int. Cl.

| | |
|---|---|
| ***H04B 7/0413*** | (2017.01) |
| ***H04B 1/00*** | (2006.01) |
| ***H04B 1/40*** | (2015.01) |
| *H04B 7/022* | (2017.01) |
| *H04B 7/08* | (2006.01) |

(52) U.S. Cl.

CPC ......... *H04B 7/0404* (2013.01); *H04B 7/0413* (2013.01); *H04B 7/022* (2013.01); *H04B 7/0608* (2013.01); *H04B 7/0825* (2013.01)

(56) References Cited

U.S. PATENT DOCUMENTS

| | | | |
|---|---|---|---|
| 9,654,169 | B2 | 5/2017 | Wloczysiak |
| 9,985,680 | B2 | 5/2018 | Wloczysiak |
| 10,659,121 | B2 | 5/2020 | Pehlke |
| 11,336,242 | B2 | 5/2022 | Kim et al. |
| 11,336,406 | B2 | 5/2022 | Park et al. |
| 2004/0102172 | A1 | 5/2004 | Hendin |
| 2005/0277387 | A1 | 12/2005 | Kojima et al. |
| 2006/0252380 | A1 | 11/2006 | Khayrallah et al. |
| 2007/0249312 | A1 | 10/2007 | Shatara et al. |
| 2008/0136514 | A1* | 6/2008 | Behzad .................. H03F 3/195 330/126 |
| 2008/0224927 | A1 | 9/2008 | De Abreu |
| 2009/0285135 | A1 | 11/2009 | Rousu et al. |
| 2009/0295230 | A1 | 12/2009 | Rousu et al. |
| 2010/0022197 | A1 | 1/2010 | Kato et al. |
| 2010/0157858 | A1 | 6/2010 | Lee et al. |
| 2010/0204587 | A1 | 8/2010 | Lin et al. |
| 2010/0260082 | A1 | 10/2010 | Lum et al. |
| 2011/0148705 | A1* | 6/2011 | Kenington ................ H03F 3/68 342/372 |
| 2011/0210787 | A1 | 9/2011 | Lee et al. |
| 2012/0020280 | A1 | 1/2012 | Jansson et al. |
| 2012/0052822 | A1 | 3/2012 | Monroe |
| 2012/0112969 | A1 | 5/2012 | Caballero et al. |
| 2012/0300245 | A1 | 11/2012 | Chatierjee et al. |
| 2012/0327825 | A1 | 12/2012 | Gudem et al. |
| 2013/0037924 | A1 | 2/2013 | Lee et al. |
| 2013/0051284 | A1 | 2/2013 | Khlat |
| 2013/0109333 | A1 | 5/2013 | Rowson et al. |
| 2013/0162486 | A1 | 6/2013 | Korva et al. |
| 2013/0321095 | A1 | 12/2013 | Lam et al. |
| 2014/0003300 | A1 | 1/2014 | Weissman et al. |
| 2014/0024322 | A1 | 1/2014 | Khlat |
| 2014/0105079 | A1 | 4/2014 | Bengtsson et al. |
| 2014/0133364 | A1 | 5/2014 | Weissman et al. |
| 2014/0266429 | A1 | 9/2014 | Khlat et al. |
| 2015/0126136 | A1 | 5/2015 | Robinett et al. |
| 2016/0352373 | A1 | 12/2016 | Wloczysiak |
| 2017/0155421 | A1 | 6/2017 | Wloczysiak |
| 2017/0230088 | A1 | 8/2017 | Wloczysiak |
| 2017/0294947 | A1 | 10/2017 | Little et al. |
| 2017/0373730 | A1 | 12/2017 | Pehlke et al. |
| 2018/0007600 | A1 | 1/2018 | Gopal et al. |
| 2018/0331714 | A1 | 11/2018 | See et al. |
| 2019/0007073 | A1 | 1/2019 | King et al. |
| 2019/0097715 | A1 | 3/2019 | Maldonado et al. |
| 2019/0356344 | A1 | 11/2019 | Takada |
| 2020/0028562 | A1 | 1/2020 | Yang |
| 2020/0112348 | A1 | 4/2020 | Pehlke et al. |
| 2020/0313812 | A1 | 10/2020 | Park et al. |
| 2020/0366320 | A1 | 11/2020 | An et al. |
| 2020/0395959 | A1 | 12/2020 | Gluck et al. |
| 2021/0083635 | A1 | 3/2021 | Kim et al. |
| 2021/0211145 | A1 | 7/2021 | Loh et al. |

FOREIGN PATENT DOCUMENTS

| | | | |
|---|---|---|---|
| CN | 103390796 | A | 11/2013 |
| EP | 2523355 | A1 | 11/2012 |
| EP | 2720378 | A1 | 4/2014 |
| JP | 2003-032140 | A | 1/2003 |
| JP | 2003-087023 | A | 3/2003 |
| JP | 2003-169008 | A | 6/2003 |
| JP | 2009-016921 | A | 1/2009 |
| JP | 2010-252346 | A | 11/2010 |
| JP | 2012-105334 | A | 5/2012 |
| WO | WO 2013/041146 | A1 | 3/2013 |
| WO | WO 2013/131051 | A1 | 9/2013 |
| WO | WO 2014/088218 | A1 | 6/2014 |
| WO | WO 2015/117433 | A1 | 8/2015 |

OTHER PUBLICATIONS

Pehlke, et al., U.S. Appl. No. 16/868,370, filed May 6, 2020, Apparatus and Methods for Radio Frequency Front-Ends.

* cited by examiner

APPARATUS AND METHODS FOR RADIO FREQUENCY FRONT-ENDS

CROSS-REFERENCE TO RELATED APPLICATIONS

This application is a continuation of U.S. patent application Ser. No. 16/868,370, filed May 6, 2020 and titled "APPARATUS AND METHODS FOR RADIO FREQUENCY FRONT-ENDS," which is a continuation of U.S. patent application Ser. No. 15/920,783, filed Mar. 14, 2018 and titled "APPARATUS AND METHODS FOR RADIO FREQUENCY FRONT-ENDS," which claims the benefit of priority under 35 U.S.C. § 119(e) of U.S. Provisional Patent Application No. 62/471,902, filed Mar. 15, 2017 and titled "APPARATUS AND METHODS FOR RADIO FREQUENCY FRONT END SYSTEMS," which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 450 MHz to about 6 GHz for certain communications standards.

Examples of RF communication systems include, but are not limited to, mobile phones, tablets, base stations, network access points, customer-premises equipment (CPE), laptops, and wearable electronics.

SUMMARY

In certain embodiments, the present disclosure relates to a wireless device. The wireless device includes a plurality of antennas including a first primary antenna, a second primary antenna, a first diversity antenna, and a second diversity antenna, a transceiver, and a radio frequency front end system electrically coupled between the transceiver and the plurality of antennas. The radio frequency front end system includes a plurality of ultrahigh band modules each configured to output an ultrahigh band transmit signal having a frequency content greater than about 3 gigahertz, the plurality of ultrahigh band modules including a first ultrahigh band module electrically coupled to the first primary antenna, a second ultrahigh band module electrically coupled to the second primary antenna, a third ultrahigh band module electrically coupled to the first diversity antenna, and a fourth ultrahigh band module electrically coupled to the second diversity antenna.

In some embodiments, the radio frequency front end system further includes a shared power management circuit configured to provide a common power amplifier supply voltage to the plurality of ultrahigh band modules.

In various embodiments, the radio frequency front end system further includes at least one radio frequency module configured to process a plurality of radio frequency signals having a frequency content of less than about 3 gigahertz, the transceiver being shared by the plurality of ultrahigh band modules and the at least one radio frequency module. According to a number of embodiments, the plurality of radio frequency signals include at least one low band signal having a frequency content of less than about 1 gigahertz, at least one mid band signal having a frequency content between about 1 gigahertz and about 2.3 gigahertz, and at least one high band signal having a frequency content between about 2.3 gigahertz and about 3 gigahertz. In accordance with several embodiments, the at least one radio frequency module includes a high band module, the radio frequency front end system further including a shared power management circuit configured to provide a common power amplifier supply voltage to the plurality of ultrahigh band modules and to the high band module.

In some embodiments, the radio frequency front end system is operable to provide antenna swapping for one or more ultrahigh frequency bands without an antenna swap switch.

In various embodiments, each of the plurality of ultrahigh band modules are each further configured to process an ultrahigh band receive signal.

In a number of embodiments, the plurality of ultrahigh band modules are operable to support uplink carrier aggregation using one or more ultrahigh frequency carriers.

In several embodiments, the plurality of ultrahigh band modules includes at least one power amplifier with integrated duplexer module.

In some embodiments, each of the plurality of ultrahigh band modules is configured to provide radio frequency signal processing in a frequency range between about 3.4 gigahertz and about 3.8 gigahertz.

In certain embodiments, the present disclosure relates to a radio frequency front end system. The radio frequency front end system includes a plurality of antenna terminals including a first primary antenna terminal, a second primary antenna terminal, a first diversity antenna terminal, and a second diversity antenna terminal. The radio frequency front end system further includes a plurality of ultrahigh band modules electrically coupled to the plurality of antenna terminals and each configured to output an ultrahigh band transmit signal having a frequency content greater than about 3 gigahertz. The plurality of ultrahigh band modules including a first ultrahigh band module electrically coupled to the first primary antenna terminal, a second ultrahigh band module electrically coupled to the second primary antenna terminal, a third ultrahigh band module electrically coupled to the first diversity antenna terminal, and a fourth ultrahigh band module electrically coupled to the second diversity antenna terminal.

In several embodiments, the radio frequency front end system further includes a shared power management circuit configured to provide a common power amplifier supply voltage to the plurality of ultrahigh band modules.

In some embodiments, the radio frequency front end system further includes at least one radio frequency module configured to process a plurality of radio frequency signals having a frequency content of less than about 3 gigahertz. According to a number of embodiments, the plurality of radio frequency signals include at least one low band signal having a frequency content of less than about 1 gigahertz, at least one mid band signal having a frequency content between about 1 gigahertz and about 2.3 gigahertz, and at least one high band signal having a frequency content between about 2.3 gigahertz and about 3 gigahertz. In accordance with various embodiments, the at least one radio frequency module includes a high band module, the radio frequency front end system further comprising a shared power management circuit configured to provide a common power amplifier supply voltage to the plurality of ultrahigh band modules and to the high band module.

In several embodiments, each of the plurality of ultrahigh band modules are each further configured to process an ultrahigh band receive signal.

In a number of embodiments, the plurality of ultrahigh band modules are operable to support uplink carrier aggregation using one or more ultrahigh frequency carriers.

In various embodiments, each of the plurality of ultrahigh band modules is configured to provide radio frequency signal processing in a frequency range between about 3.4 gigahertz and about 3.8 gigahertz.

In some embodiments, the radio frequency front end system is implemented on a phone board.

In certain embodiments, the present disclosure relates to a method of radio frequency signal communication. The method includes generating four or more ultrahigh band transmit signals each having a frequency content greater than about 3 gigahertz using four or more ultrahigh band modules of a wireless device, each of the four or more ultrahigh band modules outputting a corresponding one of the four or more ultrahigh band transmit signals. The method further includes transmitting the four or more ultrahigh band transmit signals using four or more antennas of the wireless device, the four or more antennas including at least two primary antennas and at least two diversity antennas. The method further includes powering the four or more ultrahigh band transmit signals using a common power amplifier supply voltage.

In certain embodiments, the present disclosure relates to a wireless device. The wireless device includes a plurality of antennas including a first primary antenna, a second primary antenna, a first diversity antenna and a second diversity antenna, a transceiver, and a radio frequency front end system electrically coupled between the transceiver and the plurality of primary antennas. The radio frequency front end system further includes a plurality of ultrahigh band transmit and receive modules including a first ultrahigh band transmit and receive module electrically coupled to the first primary antenna, a second ultrahigh band transmit and receive module electrically coupled to the second primary antenna, a third ultrahigh band transmit and receive module electrically coupled to the first diversity antenna, and a fourth ultrahigh band transmit and receive module electrically coupled to the second diversity antenna.

In some embodiments, the radio frequency front end system further includes a shared power management circuit configured to provide a common power amplifier supply voltage to the plurality of ultrahigh band transmit and receive modules.

In several embodiments, the wireless device further includes one or more primary modules configured to transmit and receive a plurality of signals via the first primary antenna and the second primary antenna, the plurality of ultrahigh band transmit and receive modules configured to process signals of higher frequency than the one or more primary modules.

According to a number of embodiments, the plurality of signals include at least one low band radio frequency signal, at least one mid band radio frequency signal, and at least one high band radio frequency signal.

In accordance with various embodiments, the transceiver is shared between the plurality of ultrahigh band transmit and receive modules and the one or more primary modules. According to a some embodiments, the wireless device further includes one or more diversity modules configured to receive a plurality of diversity signals via the first diversity antenna and the second diversity antenna, the plurality of ultrahigh band transmit and receive modules configured to process signals of higher frequency than the one or more diversity modules. In accordance with a number of embodiments, the plurality of diversity signals include at least one low band radio frequency signal, at least one mid band radio frequency signal, and at least one high band radio frequency signal. According to several embodiments, the transceiver is shared between the plurality of ultrahigh band transmit and receive modules, the one or more primary modules, and the one or more diversity modules.

According to a number of embodiment, the one or more primary modules includes a high band module, the radio frequency front end system further including a shared power management circuit configured to provide a common power amplifier supply voltage to the plurality of ultrahigh band transmit and receive modules and to the high band module.

In several embodiments, the radio frequency front end system is operable to provide antenna swapping for one or more ultrahigh frequency bands without an antenna swap switch.

In some embodiments, the plurality of ultrahigh band transmit and receive modules are operable to support four-by-four downlink multi-input and multi-output communications on one or more ultrahigh frequency bands.

In various embodiments, the plurality of ultrahigh band transmit and receive modules are operable to support four-by-four uplink multi-input and multi-output communications on one or more ultrahigh frequency bands.

In a number of embodiments, a frequency content of the one or more ultrahigh frequency bands is between about 3 GHz and about 6 GHz.

In several embodiments, the plurality of ultrahigh band transmit and receive modules are operable to support uplink carrier aggregation using one or more ultrahigh frequency carriers.

In some embodiments, the plurality of ultrahigh band transmit and receive modules are operable to support uplink carrier aggregation using one or more ultrahigh frequency carriers.

In accordance with a number of embodiments, a frequency content of the one or more ultrahigh frequency carriers is between about 3 GHz and about 6 GHz.

In several embodiments, the plurality of ultrahigh band modules includes a plurality of power amplifier with integrated duplexer modules.

In certain embodiments, the present disclosure relates to a radio frequency front end system for a wireless device. The radio frequency front end system includes a plurality of antenna terminals including a first primary antenna terminal, a second primary antenna terminal, a first diversity antenna terminal, and a second diversity antenna terminal. The radio frequency front end system further includes a plurality of ultrahigh band transmit and receive modules electrically coupled to the plurality of antenna terminals, including a first ultrahigh band transmit and receive module electrically coupled to the first primary antenna terminal, a second ultrahigh band transmit and receive module electrically coupled to the second primary antenna terminal, a third ultrahigh band transmit and receive module electrically coupled to the first diversity antenna terminal, and a fourth ultrahigh band transmit and receive module electrically coupled to the second diversity antenna terminal.

In various embodiments, the radio frequency front end system further includes a shared power management circuit configured to provide a common power amplifier supply voltage to the plurality of ultrahigh band transmit and receive modules.

In several embodiments, the radio frequency front end system further includes one or more primary modules configured to transmit and receive a plurality of signals via the first primary antenna terminal and the second primary antenna terminal, the plurality of ultrahigh band transmit and receive modules configured to process signals of higher frequency than the one or more primary modules.

According to a number of embodiments, the plurality of signals include at least one low band radio frequency signal, at least one mid band radio frequency signal, and at least one high band radio frequency signal.

In accordance with several embodiments, the radio frequency front end system further includes one or more diversity modules configured to receive a plurality of diversity signals via the first diversity antenna terminal and the second diversity antenna terminal, the plurality of ultrahigh band transmit and receive modules configured to process signals of higher frequency than the one or more diversity modules.

According to various embodiments, the plurality of diversity signals include at least one low band radio frequency signal, at least one mid band radio frequency signal, and at least one high band radio frequency signal.

In accordance with some embodiments, the one or more primary modules includes a high band module, the radio frequency front end system further including a shared power management circuit configured to provide a common power amplifier supply voltage to the plurality of ultrahigh band transmit and receive modules and to the high band module.

In several embodiments, the radio frequency front end system is operable to provide antenna swapping for one or more ultrahigh frequency bands without an antenna swap switch.

In various embodiments, the plurality of ultrahigh band transmit and receive modules are operable to support four-by-four downlink multi-input and multi-output communications on one or more ultrahigh frequency bands.

In some embodiments, the plurality of ultrahigh band transmit and receive modules are operable to support four-by-four uplink multi-input and multi-output communications on one or more ultrahigh frequency bands. According to several embodiments, a frequency content of the one or more ultrahigh frequency bands is between about 3 GHz and about 6 GHz.

In a number of embodiments, the plurality of ultrahigh band transmit and receive modules are operable to support uplink carrier aggregation using one or more ultrahigh frequency carriers.

In some embodiments, the plurality of ultrahigh band transmit and receive modules are operable to support uplink carrier aggregation using one or more ultrahigh frequency carriers. According to several embodiments, a frequency content of the one or more ultrahigh frequency carriers is between about 3 GHz and about 6 GHz.

In various embodiments, plurality of ultrahigh band modules includes a plurality of power amplifier with integrated duplexer modules.

In certain embodiments, the present disclosure relates to a phone board for wireless device. The phone board includes a printed circuit board substrate. The phone board further includes a plurality of antennas attached to the printed circuit board substrate, the plurality of antennas including a first primary antenna, a second primary antenna, a first diversity antenna, and a second diversity antenna. The phone board further includes a plurality of ultrahigh band transmit and receive modules attached to the printed circuit board substrate and electrically coupled to the plurality of antennas. The phone board further includes a shared power management circuit attached to the printed circuit board substrate and configured to provide a common power amplifier supply voltage to the plurality of ultrahigh band transmit and receive modules.

In some embodiments, the first primary antenna and the second primary antenna are located on a first side of the printed circuit board substrate, and the first diversity antenna and the second diversity antenna are located on a second side of the printed circuit board substrate opposite the first side.

In various embodiments, the phone board further includes one or more primary modules attached to the printed circuit board substrate and configured to transmit and receive a plurality of signals via the first primary antenna and the second primary antenna, the plurality of ultrahigh band transmit and receive modules configured to process signals of higher frequency than the one or more primary modules.

According to several embodiments, the plurality of signals include at least one low band radio frequency signal, at least one mid band radio frequency signal, and at least one high band radio frequency signal.

In accordance with some embodiments, the phone board further includes a transceiver attached to the printed circuit board substrate and shared between the plurality of ultrahigh band transmit and receive modules and the one or more primary modules.

According to a number of embodiments, the one or more primary modules includes a high band module, the shared power management circuit further configured to provide the common power amplifier supply voltage to the high band module.

DETAILED DESCRIPTION OF EMBODIMENTS

Figure 1:
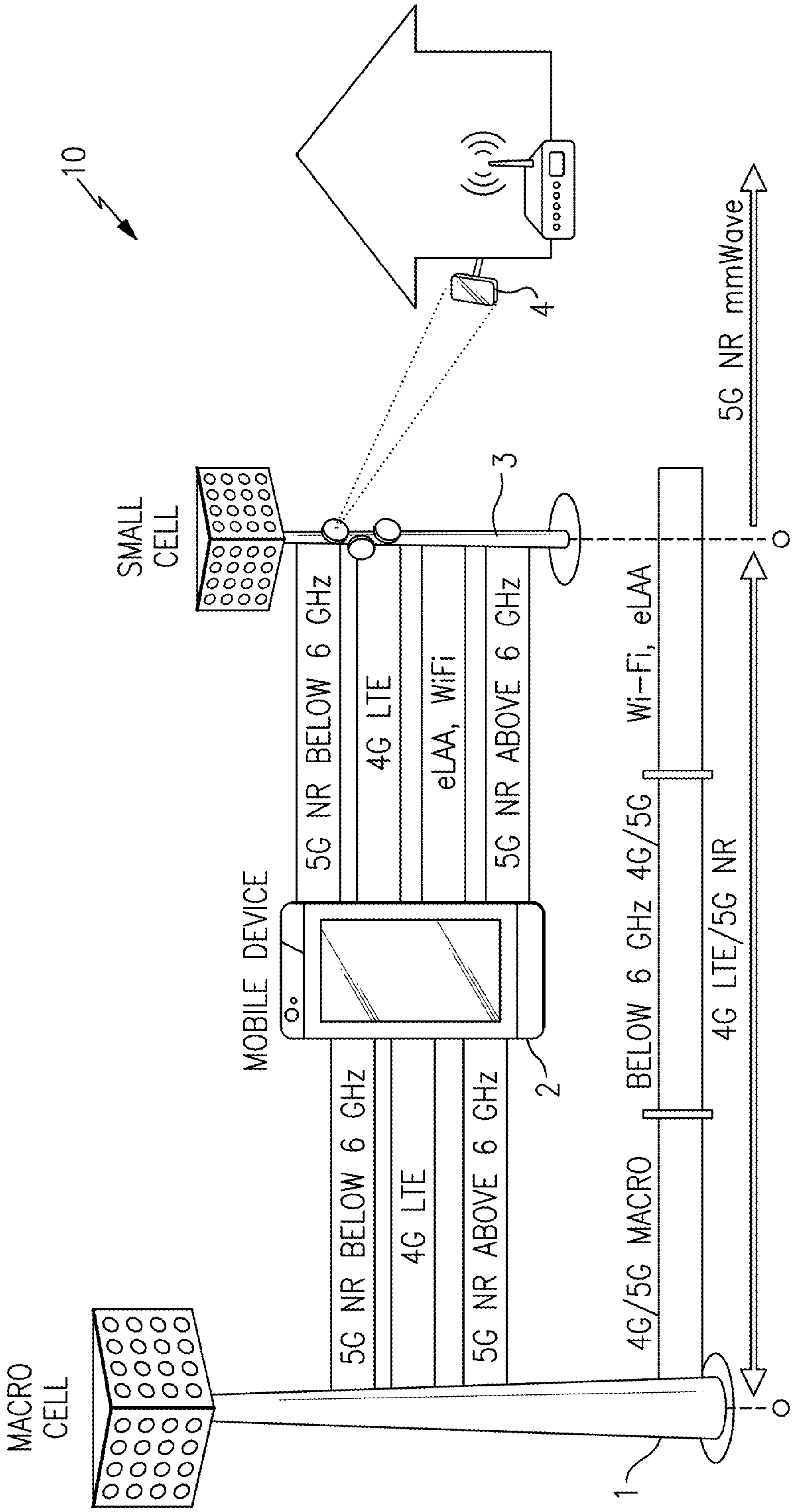
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet-of-Things (NB-IOT), Vehicle-to-Everything (V2X), and High Power User Equipment (HPUE).

3GPP plans to introduce Phase 1 of fifth generation (5G) technology in Release 15 (targeted for 2018) and Phase 2 of 5G technology in Release 16 (targeted for 2019). Release 15 is anticipated to address 5G communications at less than 6 GHz, while Release 16 is anticipated to address communications at 6 GHz and higher. Subsequent 3GPP releases will further evolve and expand 5G technology. 5G technology is also referred to herein as 5G New Radio (NR).

Preliminary specifications for 5G NR support a variety of features, such as communications over millimeter wave spectrum, beam forming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a mobile device 2, a small cell base station 3, and a stationary wireless device 4.

The illustrated communication network 10 of FIG. 1 supports communications using a variety of technologies, including, for example, 4G LTE, 5G NR, and wireless local area network (WLAN), such as Wi-Fi. Although various examples of supported communication technologies are shown, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

As shown in FIG. 1, the mobile device 2 communicates with the macro cell base station 1 over a communication link that uses a combination of 4G LTE and 5G NR technologies. The mobile device 2 also communications with the small cell base station 3. In the illustrated example, the mobile device 2 and small cell base station 3 communicate over a communication link that uses 5G NR, 4G LTE, and Wi-Fi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed Wi-Fi frequencies).

In certain implementations, the mobile device 2 communicates with the macro cell base station 2 and the small cell base station 3 using 5G NR technology over one or more frequency bands that are less than 6 Gigahertz (GHz) and/or over one or more frequency bands that are greater than 6 GHz. In one embodiment, the mobile device 2 supports a HPUE power class specification.

The illustrated small cell base station 3 also communicates with a stationary wireless device 4. The small cell base station 3 can be used, for example, to provide broadband service using 5G NR technology. In certain implementations, the small cell base station 3 communicates with the stationary wireless device 4 over one or more millimeter wave frequency bands in the frequency range of 30 GHz to 300 GHz and/or upper centimeter wave frequency bands in the frequency range of 24 GHz to 30 GHz.

In certain implementations, the small cell base station 3 communicates with the stationary wireless device 4 using beamforming. For example, beamforming can be used to focus signal strength to overcome path losses, such as high loss associated with communicating over millimeter wave frequencies.

The communication network 10 of FIG. 1 includes the macro cell base station 1 and the small cell base station 3. In certain implementations, the small cell base station 3 can operate with relatively lower power, shorter range, and/or with fewer concurrent users relative to the macro cell base station 1. The small cell base station 3 can also be referred to as a femtocell, a picocell, or a microcell.

Although the communication network 10 is illustrated as including two base stations, the communication network 10 can be implemented to include more or fewer base stations and/or base stations of other types.

The communication network 10 of FIG. 1 is illustrated as including one mobile device and one stationary wireless device. The mobile device 2 and the stationary wireless device 4 illustrate two examples of user devices or user equipment (UE). Although the communication network 10 is illustrated as including two user devices, the communication network 10 can be used to communicate with more or fewer user devices and/or user devices of other types. For example, user devices can include mobile phones, tablets, laptops, IoT devices, wearable electronics, and/or a wide variety of other communications devices.

User devices of the communication network 10 can share available network resources (for instance, available frequency spectrum) in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDM is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user device a unique code, space-divisional multiple access (SDMA) in which beamforming is used to provide shared access by spatial division, and non-orthogonal multiple access (NOMA) in which the power domain is used for multiple access. For example, NOMA can be used to serve multiple user devices at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user device. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to eMBB, uRLLC, and/or mMTC.

A peak data rate of a communication link (for instance, between a base station and a user device) depends on a variety of factors. For example, peak data rate can be affected by channel bandwidth, modulation order, a number of component carriers, and/or a number of antennas used for communications.

For instance, in certain implementations, a data rate of a communication link can be about equal to $M*B*\log_2(1+S/N)$, where M is the number of communication channels, B is the channel bandwidth, and S/N is the signal-to-noise ratio (SNR).

Accordingly, data rate of a communication link can be increased by increasing the number of communication channels (for instance, transmitting and receiving using multiple antennas), using wider bandwidth (for instance, by aggregating carriers), and/or improving SNR (for instance, by increasing transmit power and/or improving receiver sensitivity).

5G NR communication systems can employ a wide variety of techniques for enhancing data rate and/or communication performance.

Figure 2A:
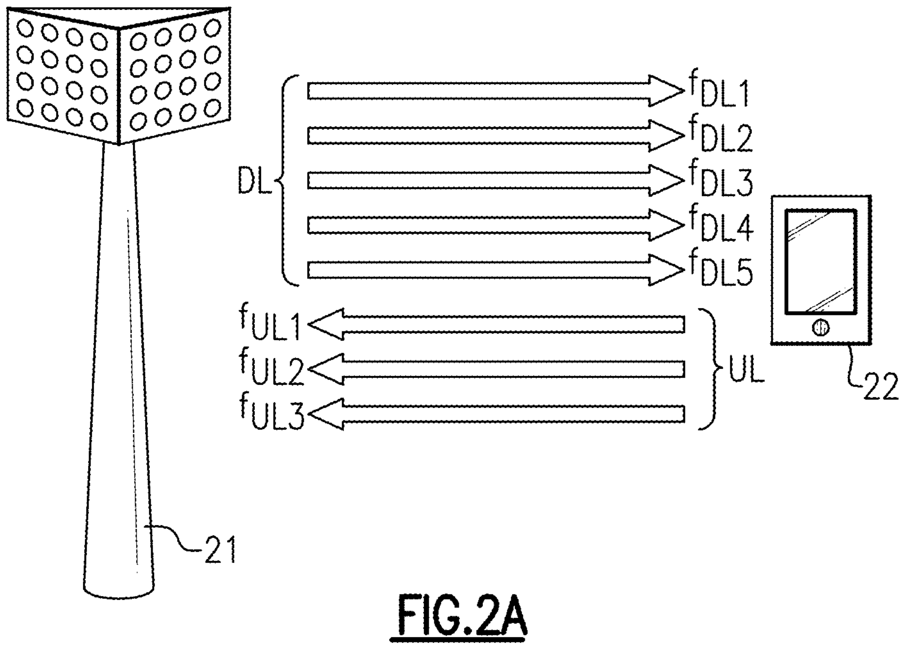
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
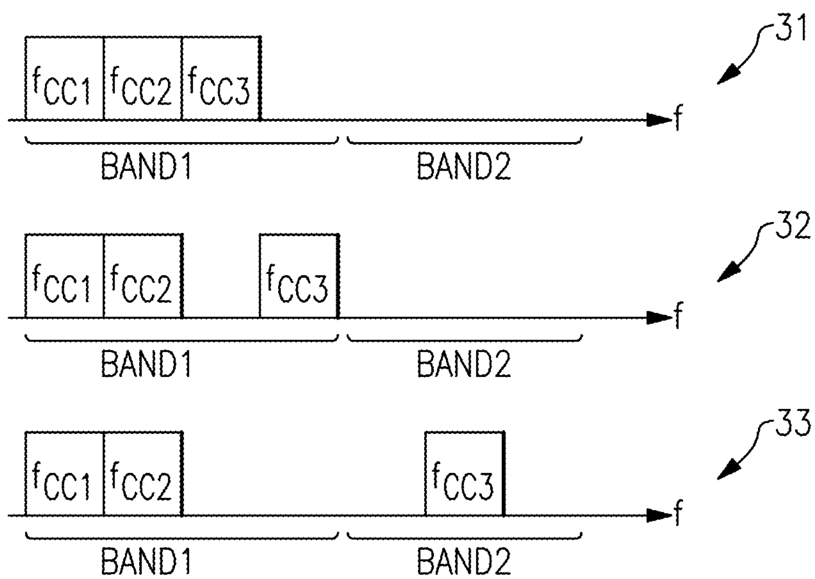
FIG. 2B illustrates various examples of carrier aggregation for the communication link of FIG. 2A.

FIG. 2B illustrates various examples of carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{cc1}$, a second component carrier $f_{cc2}$, and a third component carrier $f_{cc3}$. Although FIG. 2B is illustrated in the context of aggregating three component carriers, carrier aggregation can be used to aggregate more or fewer carriers.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{cc1}$, $f_{cc2}$, and $f_{cc3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{cc1}$, $f_{cc2}$, and $f_{cc3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{cc1}$ and $f_{cc2}$ of a first frequency band BAND1 with component carrier $f_{cc3}$ of a second frequency band BAND2.

With reference to FIGS. 2A and 2B, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and second cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as Wi-Fi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid Wi-Fi users and/or to coexist with Wi-Fi users. Enhanced license assisted access (eLAA) refers to an evolution of LAA that aggregates licensed and unlicensed spectrum for both downlink and uplink.

Figure 3A:
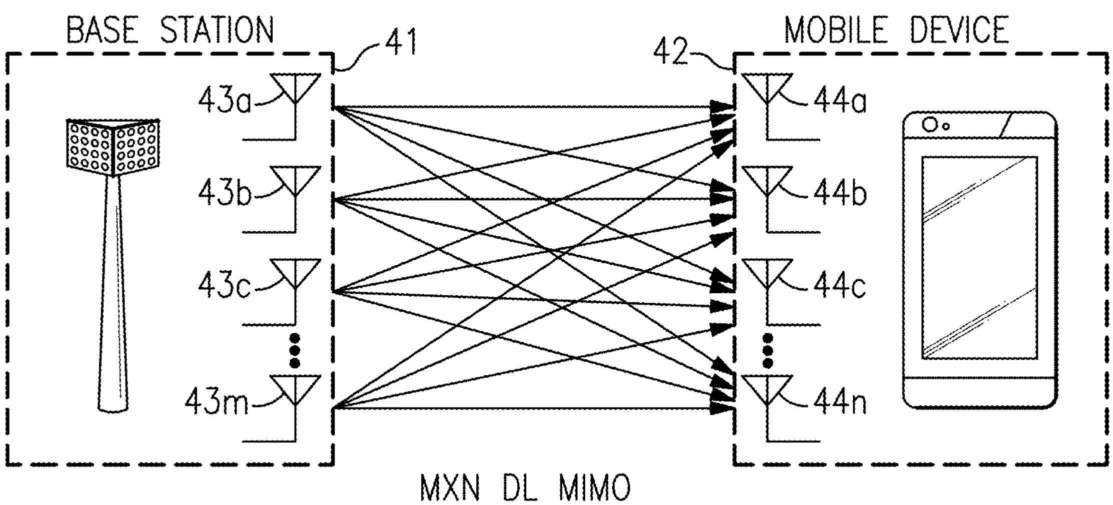
FIG. 3A is a schematic diagram of one example of a downlink channel using multi-input and multi-output (MIMO) communications.
Figure 3B:
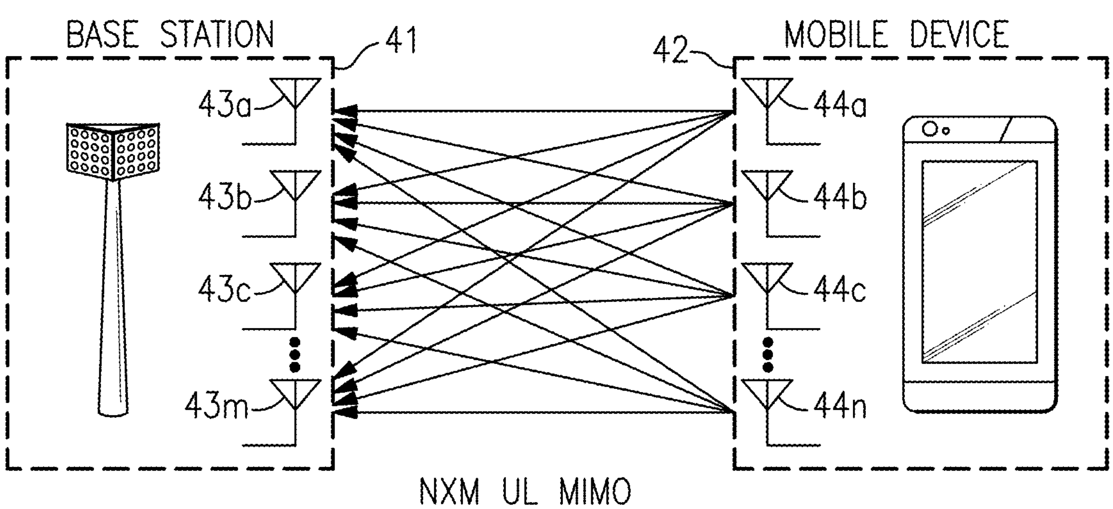
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43*a*, 43*b*, 43*c*, . . . 43*m* of the base station 41 and receiving using N antennas 44*a*, 44*b*, 44*c*, . . . 44*n* of the mobile device 42. Accordingly, FIG. 3A illustrates an example of M×N DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44*a*, 44*b*, 44*c*, . . . 44*n* of the mobile device 42 and receiving using M antennas 43*a*, 43*b*, 43*c*, . . . 43*m* of the base station 41. Accordingly, FIG. 3B illustrates an example of N×M UL MIMO.

By increasing the level or order of MIMO, bandwidth of an uplink channel and/or a downlink channel can be increased.

MIMO communications are applicable to communication links of a variety of types, such as FDD communication links and TDD communication links.

Examples of Radio Frequency Electronics with Multiple UHB Modules

A radio frequency (RF) communication device can include multiple antennas for supporting wireless communications. Additionally, the RF communication device can include a radio frequency front-end (RFFE) system for processing signals received from and transmitted by the antennas. The RFFE system can provide a number of functions, including, but not limited to, signal filtering, controlling component connectivity to the antennas, and/or signal amplification.

RFFE systems can be used to handle RF signals of a wide variety of types, including, but not limited to, wireless local area network (WLAN) signals, Bluetooth signals, and/or cellular signals.

Additionally, RFFE systems can be used to process signals of a wide range of frequencies. For example, certain RFFE systems can operate using one or more low bands (for example, RF signal bands having a frequency content of 1 GHz or less, also referred to herein as LB), one or more mid bands (for example, RF signal bands having a frequency content between 1 GHz and 2.3 GHz, also referred to herein as MB), one or more high bands (for example, RF signal bands having a frequency content between 2.3 GHz and 3 GHz, also referred to herein as HB), and one or more ultrahigh bands (for example, RF signal bands having a frequency content between 3 GHz and 6 GHz, also referred to herein as UHB).

RFFE systems can be used in a wide variety of RF communication devices, including, but not limited to, smartphones, base stations, laptops, handsets, wearable electronics, and/or tablets.

An RFFE system can be implemented to support a variety of features that enhance bandwidth and/or other performance characteristics of the RF communication device in which the RFFE system is incorporated.

In one example, an RFFE system is implemented to support carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels, for instance up to five carriers. Carrier aggregation includes contiguous aggregation, in which contiguous carriers within the same operating frequency band are aggregated. Carrier aggregation can also be non-contiguous, and can include carriers separated in frequency within a common band or in different bands.

In another example, an RFFE system is implemented to support multi-input and multi-output (MIMO) communications to increase throughput and enhance mobile broadband service. MIMO communications use multiple antennas for communicating multiple data streams over a single radio frequency channel. MIMO communications benefit from higher signal to noise ratio, improved coding, and/or reduced signal interference due to spatial multiplexing differences of the radio environment.

MIMO order refers to a number of separate data streams sent or received. For instance, a MIMO order for downlink communications can be described by a number of transmit antennas of a base station and a number of receive antennas for user equipment (UE), such as a mobile device.

RFFE systems that support carrier aggregation and multi-order MIMO can be used in RF communication devices that operate with wide bandwidth. For example, such RFFE systems can be used in applications servicing multimedia content streaming at high data rates.

Fifth Generation (5G) technology seeks to achieve high peak data rates above 10 Gbps. Certain 5G high-speed communications can be referred to herein as Enhanced Multi-user Broadband (eMBB).

To achieve eMBB data rates, RF spectrum available at millimeter wave frequencies (for instance, 30 GHz and higher) is attractive, but significant technical hurdles are present in managing the loss, signal conditioning, radiative phased array aspects of performance, beam tracking, test, and/or packaging in the handset associated with millimeter wave communications.

The RFFE systems herein can operate using not only LB, MB, and HB frequencies, but also ultrahigh band (UHB) frequencies in the range of about 3 GHz to about 6 GHz, and more particular between about 3.4 GHz and about 3.8 GHz. By communicating using UHB, enhanced peak data rates can be achieved without the technical hurdles associated with millimeter wave communications.

In certain implementations herein, UHB transmit and receive modules are employed for both transmission and reception of UHB signals via at least two primary antennas and at least two diversity antennas, thereby providing both 4×4 RX MIMO and 4×4 TX MIMO with respect to one or more UHB frequency bands, such as Band 42 (about 3.4 GHz to about 3.6 GHz), Band 43 (about 3.6 GHz to about 3.8 GHz), and/or Band 48 (about 3.55 GHz to about 3.7 GHz). Furthermore, in certain configurations, the RFFE systems herein employ carrier aggregation using one or more UHB carrier frequencies, thereby providing flexibility to widen bandwidth for uplink and/or downlink communications.

By enabling high-order MIMO and/or carrier aggregation features using UHB spectrum, enhanced data rates can be achieved. Additionally, rather than using dedicated 5G antennas and a separate transceiver, shared antennas and/or a shared transceiver (for example, a semiconductor die including a shared transceiver fabricated thereon) can be used for both 5G UHB communications and 4G/LTE communications associated with HB, MB, and/or LB. Thus, 4G/LTE communications systems can be extended to support sub-6 GHz 5G capabilities with a relatively small impact to system size and/or cost.

Figure 4A:
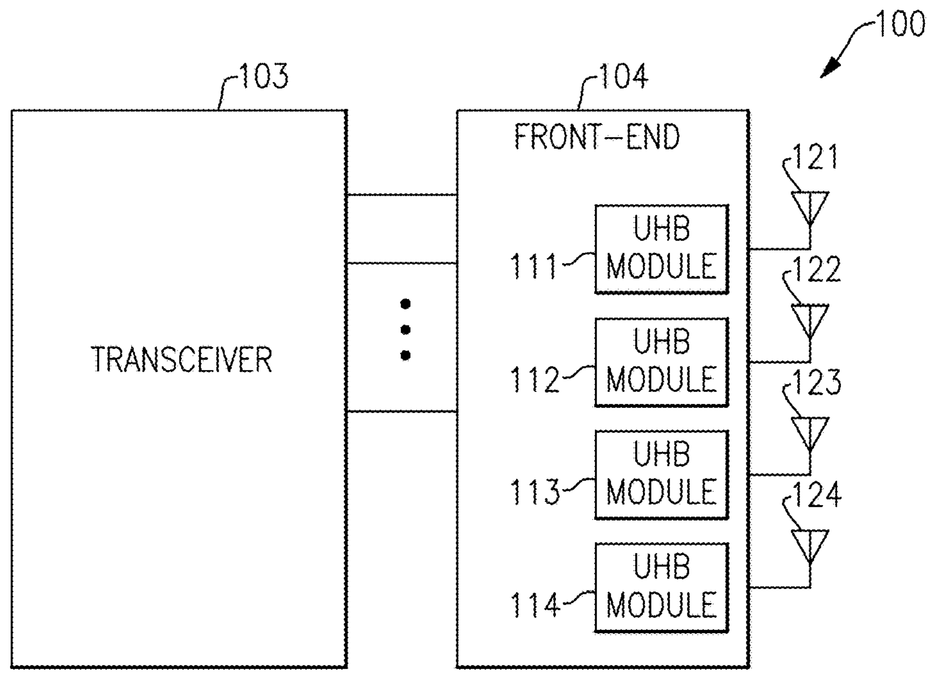
FIG. 4A is a schematic diagram of a radio frequency (RF) system according to one embodiment.

FIG. 4A is a schematic diagram of an RF system 100 according to one embodiment. The RF system 100 includes a radio frequency integrated circuit (RFIC) or transceiver 103, a front-end system 104 and antennas 121-124. In certain implementations, the antenna 121 is a first primary antenna, the antenna 122 is a second primary antenna, the antenna 123 is a first diversity antenna, and the antenna 124 is a second diversity antenna.

Although the RF system 100 is depicted as including certain components, other implementations are possible, including, but not limited to, implementations using other numbers of antennas, different implementations of components, and/or additional components.

The front-end system 104 includes a first UHB module 111, a second UHB module 112, a third UHB module 113, and a fourth UHB module 114. The front-end system 104 further includes separate antenna terminals for coupling to each of the antennas 121-124.

Thus, the front-end system 104 of FIG. 4A includes multiple UHB modules for supporting communications of UHB signals across multiple antennas. For example, in certain implementations, the UHB modules 111-114 are configured to transmit and receive UHB signals via the antennas 121-124, respectively. Accordingly, broadband communications via UHB frequency carriers can be achieved.

For clarity of the figures, the front end system 104 is depicted as including only the UHB modules 111-114. However, the front end system 104 typically includes additionally components and circuits, for example, modules associated with LB, MB, and/or HB cellular communications. Furthermore, modules can be included for Wi-Fi, Bluetooth, and/or other non-cellular communications.

Figure 4B:
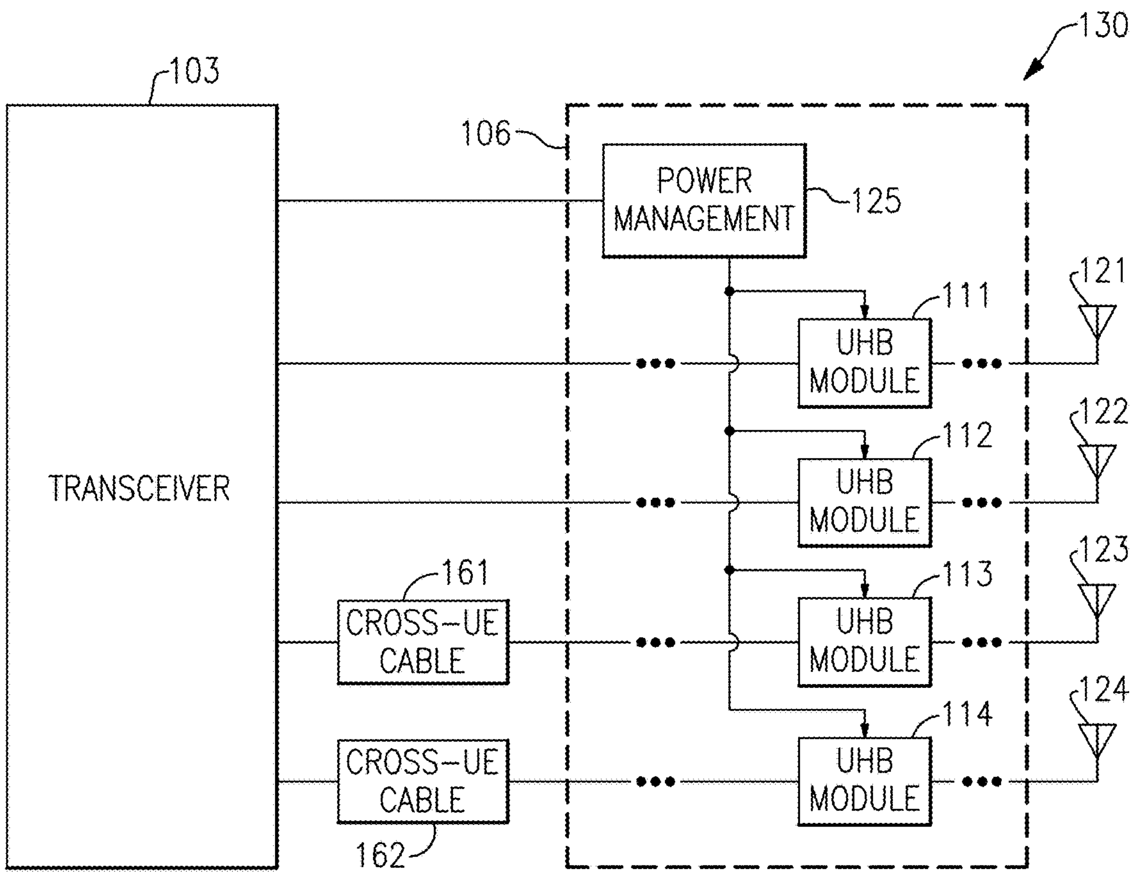
FIG. 4B is a schematic diagram of an RF system according to another embodiment.

FIG. 4B is a schematic diagram of an RF system 130 according to another embodiment. The RF system 130 includes a transceiver 103, a front-end system 106, a first primary antenna 121, a second primary antenna 122, a first diversity antenna 123, a second diversity antenna 124, a first cross-UE cable 161, and a second cross-UE cable 162. As shown in FIG. 4B, the front-end system 106 includes a first UHB module 111, a second UHB module 112, a third UHB module 113, a fourth UHB module 114, and a power management circuit 125. The front-end system 106 further includes a first primary antenna terminal for coupling to the first primary antenna 121, a second primary antenna terminal for coupling to the second primary antenna 122, a first diversity antenna terminal for coupling to the first diversity antenna 123, and a second diversity antenna terminal for coupling to the second diversity antenna 124.

As shown in FIG. 4B, the first UHB module 111 and the second UHB module 112 communicate using the first primary antenna 121 and the second primary antenna 122, respectively, and are connected to the transceiver 103 without the use of cross-UE cables. Additionally, the third UHB module 113 and the fourth UHB module 114 communicate using the first diversity antenna 123 and the second diversity antenna 124, respectively, and are connected to the transceiver 103 using the first cross-UE cable 161 and the second cross-UE cable 162, respectively.

To reduce the statistical correlation between received signals, the primary antennas 121-122 and the diversity antennas 123-124 can be separated by a relatively large physical distance in the RF system 130. For example, the diversity antennas 123-124 can be positioned near the top of the device and the primary antennas 121-122 can be positioned near the bottom of the device, or vice-versa. Additionally, the transceiver 103 can be positioned near the primary antennas 121-122 and primary modules to enhance performance of primary communications.

Accordingly, in certain implementations, the UHB modules 113-114 and diversity antennas 123-124 can be located at relatively far physical distance from the transceiver 103 and connected to the transceiver 103 via cross-UE cables 161-162, respectively.

In the illustrated embodiment, the front-end system 106 further includes a shared power management circuit 125 used to provide a supply voltage, such as a power amplifier supply voltage, to the UHB modules 111-114.

Providing power to the UHB modules 111-114 using the shared power management circuit 125 can provide a number of advantages, including, for example, high integration, reduced component count, and/or lower cost.

In certain implementations, the shared power management circuit 125 operates using average power tracking (APT), in which the voltage level of the supply voltage provided by the shared power management circuit 125 is substantially fixed over a given communication time slot. In certain implementations, the supply voltage has a relatively high voltage, and thus operates with a corresponding low current. Thus, although the UHB modules 111-114 can be distributed across the device over relatively wide distances and connected using resistive cables and/or conductors, power or $I^2$*R losses can be relatively small.

Accordingly, the shared power management circuit 125 can provide high integration with relatively low power loss.

Figure 4C:
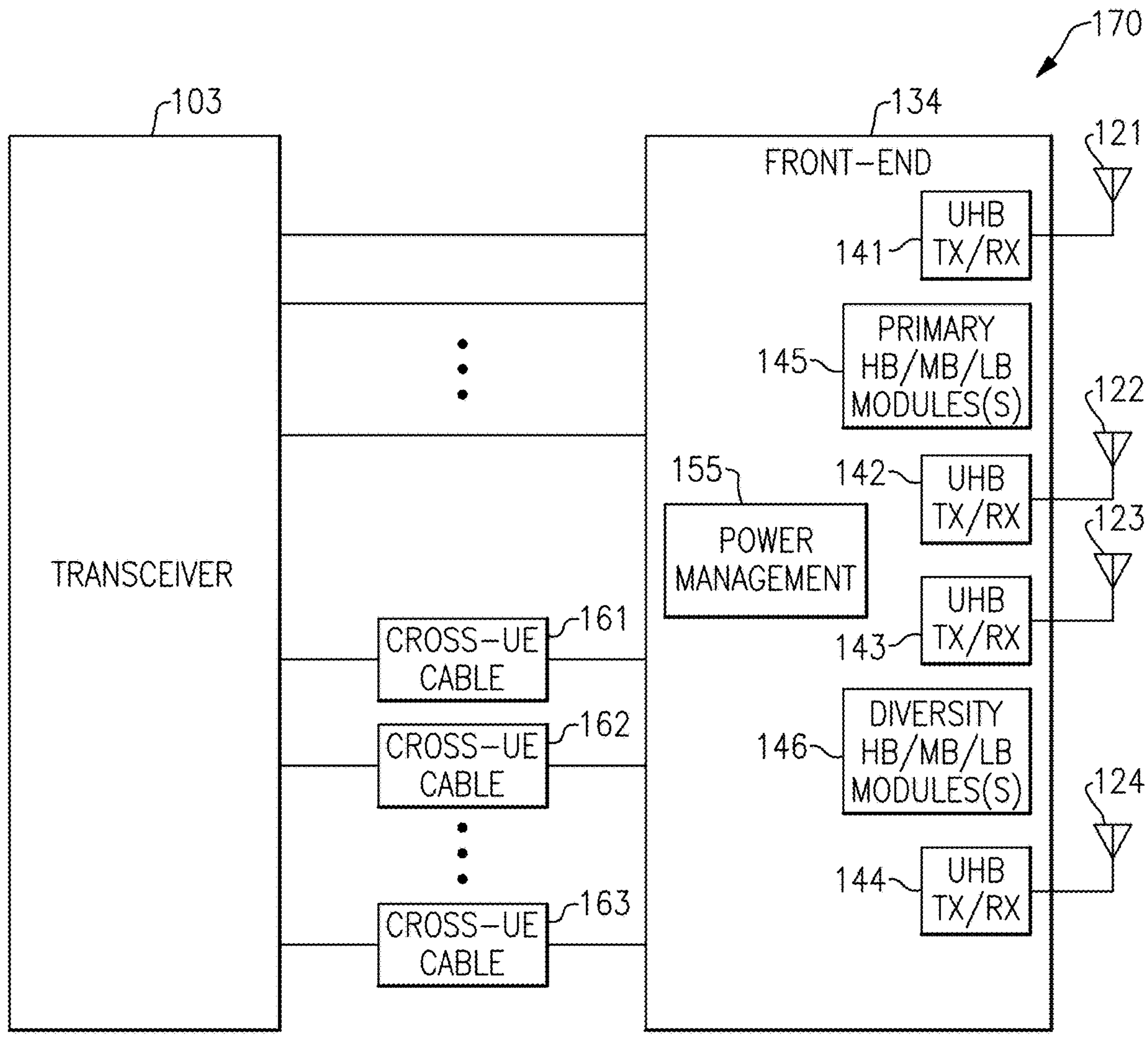
FIG. 4C is a schematic diagram of an RF system according to another embodiment.

FIG. 4C is a schematic diagram of an RF system 170 according to another embodiment. The RF system 170 includes a transceiver 103, a front-end system 134, a first primary antenna 121, a second primary antenna 122, a first diversity antenna 123, a second diversity antenna 124, a first cross-UE cable 161, a second cross-UE cable 162, and a third cross-UE cable 163.

The illustrated RF system 170 is used to transmit and receive signals of a wide variety of frequency bands, including LB, MB, HB, and UHB cellular signals. For example, the RF system 170 can process one or more LB signals having a frequency content of 1 GHz or less, one or more MB signals having a frequency content between 1 GHz and 2.3 GHz, one or more HB signals having a frequency content between 2.3 GHz and 3 GHz, and one or more UHB signals have a frequency content between 3 GHz and 6 GHz. Examples of LB frequencies include, but are not limited to Band 8, Band 20, and Band 26. Examples of MB frequencies include, but are not limited to, Band 1, Band 3, Band 4, and Band 66. Examples of HB frequencies include, but are not limited to, Band 7, Band 38, and Band 41. Examples of UHB frequencies include, but are not limited to, Band 42, Band 43, and Band 48.

The illustrated front-end system 134 includes one or more primary modules 145 used for transmitting and receive HB, MB, and/or LB signals via the primary antennas 121-122. Although illustrated as a single block, the primary modules 145 can include multiple modules collectively used to transmit and receive HB, MB, and/or LB signals via the first primary antenna 121 and the second primary antenna 122. Additionally, in certain implementations, the first primary antenna 121 and the second primary antenna 122 can be used for communicating over certain frequency ranges. For instance, in one example, the second primary antenna 122 supports LB communications but the first primary antenna 121 does not support LB communications.

With continuing reference to FIG. 4C, the front-end system 134 further includes one or more diversity modules 146 used for receiving HB, MB, and/or LB diversity signals via the diversity antennas 123-124. In certain implementations, the diversity modules 146 operate to receive but not transmit diversity signals. In other implementations, the diversity modules 146 also can be used for transmitting HB, MB, and/or LB signals.

In the illustrated embodiment, the front-end system 134 further includes a first UHB transmit and receive (TX/RX) module 141 electrically coupled to the first primary antenna 121, a second UHB transmit and receive module 142 electrically coupled to the second primary antenna 122, a third UHB transmit and receive module 143 electrically coupled to the first diversity antenna 123, and a fourth UHB transmit and receive module 144 electrically coupled to the second diversity antenna 124. The front-end system 134 further includes a first primary antenna terminal for coupling to the first primary antenna 121, a second primary antenna terminal for coupling to the second primary antenna 122, a first diversity antenna terminal for coupling to the first diversity antenna 123, and a second diversity antenna terminal for coupling to the second diversity antenna 124.

In the illustrated embodiment, the UHB transmit and receive modules 141-144 support transmit and receive of one or more UHB frequency bands, including, but not limited to, Band 42, Band 43, and/or Band 48.

Accordingly, the UHB transmit and receive modules 141-144 can be used to support 4×4 RX MIMO for UHB, 4×4 TX MIMO for UHB, and/or carrier aggregation using one or more UHB frequency carriers. Carrier aggregation using UHB frequency spectrum can include not only carrier aggregation using two or more UHB frequency carriers, but also carrier aggregation using one or more UHB frequency carriers and one or more non-HB frequency carriers, such as HB and/or MB frequency carriers.

In certain communications networks, a user demand for high downlink data rates can exceed a demand for high uplink data rates. For instance, UEs of the network, such as smartphones, may desire high speed downloading of multimedia content, but uploading relatively little data to the cloud. This in turn, can lead to the network operating with a relatively low UL to DL time slot ratio and limited opportunities for UL communications.

However, DL data rate of a network can be limited or bottlenecked by an UL data rate. For instance, in certain networks, UL data rate must stay within about 5% of DL data rate to support control, acknowledgement, and other overhead associated with the communication link. Accordingly, higher DL data rates can be achieved by increasing UL data rate.

The front-end system 134 of FIG. 4C includes UHB transmit and receive modules that advantageously support both transmission and reception of UHB signals. Accordingly, broadband UL communications via UHB frequency carriers can be achieved, thereby enhancing UL data rate and providing sufficient UL bandwidth to support overhead associated with very high data rate DL communications.

The illustrated RF system 170 advantageously includes four transmit capable UHB transmit and receive modules 141-144 coupled to the antennas 121-124, respectively. Thus, both transmit and receive are equally available at each of the antennas 121-124 for UHB communications. Thus, antenna swap can be accomplished without a swap switch to redirect a trace or route. For example, antenna selection can be achieved by controlling whether or not each UHB transmit and receive module is transmitting or receiving. Accordingly, the RF system 170 achieves antenna swap functionality for UHB without using any antenna swap switch.

In the illustrated embodiment, a shared or common transceiver 103 is used for both 4G/LTE communications using HB, MB, and LB frequencies, and also for UHB communications supporting sub-6 GHz 5G. Thus, rather than using a separate or dedicated 5G front-end and antenna interface, the shared transceiver 103 is used for both 4G/LTE communications via HB, MB, and LB frequencies and 5G UHB communications.

The illustrated RF system 170 also employs diversity communications to enhance performance. To reduce the correlation between received signals, the primary antennas 121-122 and the diversity antennas 123-124 can be separated by a relatively large physical distance in the RF system 170. For example, the diversity antennas 123-124 can be positioned near the top of the device and the primary antennas 121-122 can be positioned near the bottom of the device or vice-versa. Additionally, the transceiver 103 can be positioned near the primary antennas 121-122 and primary modules to enhance performance of primary communications.

Accordingly, in certain implementations, the UHB transmit and receive modules 143-144, the diversity module(s) 146, and the diversity antennas 123-124 can be located at relatively far physical distance from the transceiver 103 and connected to the transceiver 103 via cross-UE cables 161-163. Additionally, the UHB transmit and receive modules 141-144 can be distributed and/or placed in remote locations around the RF system 170. Although three cross-UE cables are illustrated, more or fewer cross-UE cables can be included as indicated by the ellipsis.

In the illustrated embodiment, the front-end system 134 further includes a power management circuit 155. In certain implementations, the power management circuit 155 is used to provide a supply voltage, such as a power amplifier supply voltage, which is shared by multiple components including the UHB transmit and receive modules 141-144.

Providing power to the UHB transmit and receive modules 141-144 using a shared power management circuit can provide a number of advantages, including, for example, high integration, reduced component count, and/or lower cost.

Figure 5:
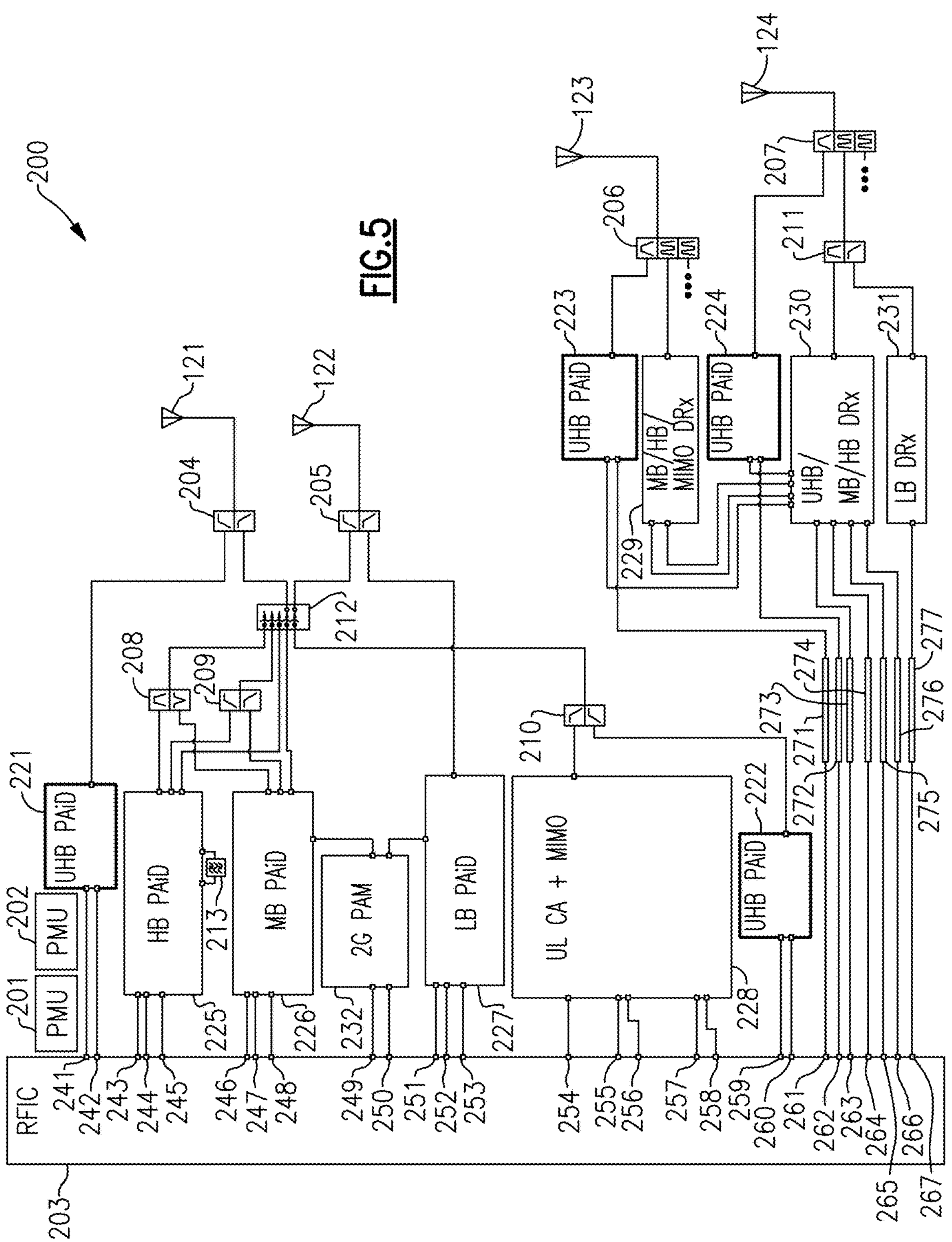
FIG. 5 is a schematic diagram of an RF system according to another embodiment.

FIG. 5 is a schematic diagram of an RF system 200 according to another embodiment. The RF system 200 includes a first primary antenna 121, a second primary antenna 122, a first diversity antenna 123, a second diversity antenna 124, a first power management unit (PMU) 201, a second PMU 202, a transceiver or RFIC 203, a first primary antenna diplexer 204, a second primary antenna diplexer 205, a first diversity antenna triplexer 206, a second diversity antenna triplexer 207, a first HB/MB diplexer 208, a second HB/MB diplexer 209, a MIMO/UHB diplexer 210, a diversity diplexer 211, a multi-throw switch 212, a HB TDD filter 213, a first UHB power amplifier with integrated duplexer (PAiD) module 221, a second UHB PAiD module 222, a third UHB PAiD module 223, a fourth UHB PAiD module 224, a HB PAiD module 225, a MB PAiD module 226, a LB PAiD module 227, an UL CA and MIMO module 228, a MB/HB MIMO diversity receive (DRx) module 229, a UHB/MB/HB DRx module 230, a LB DRx module 231, a 2G power amplifier module (PAM) 232, a first cross-UE cable 271, a second cross-UE cable 272, a third cross-UE cable 273, a fourth cross-UE cable 274, a fifth cross-UE cable 275, a sixth cross-UE cable 276, and a seventh cross-UE cable 277.

The RF system 200 includes an RFFE that provides full sub-6 GHz 5G capability provided by four remote placements of UHB PAiD modules 221-224. Although one specific embodiment of an RF system with UHB modules is shown, the teachings herein are applicable to RF electronics implemented in a wide variety of ways. Accordingly, other implementations are possible.

As shown in FIG. 5, the first UHB PAiD module 221 is coupled to the first primary antenna 121, and the second UHB PAiD module 222 is coupled to the second primary antenna 122. Additionally, the third UHB PAiD module 223 is coupled to the first diversity antenna 123, and the fourth UHB PAiD module 224 is coupled to the second diversity antenna 124. Accordingly, one UHB PAiD module is included for each of the four antennas of this embodiment.

In certain implementations, the UHB PAiD modules 221-224 support transmit and receive of one or more UHB frequency bands, including, but not limited to, Band 42, Band 43, and/or Band 48.

The RF system 200 of FIG. 5 supports 4×4 RX MIMO for UHB, 4×4 TX MIMO for UHB, and carrier aggregation (CA) with 4G and/or 5G bands.

As will be described below, the first PMU 201 and the second PMU 202 are used to provide power management to certain modules. For clarity of the figures, a connection from each PMU to the modules it powers is omitted from FIG. 5 to avoid obscuring the drawing.

In the illustrated embodiment, the first PMU 201 operates as a shared power management circuit for the first UHB PAiD module 221, the second UHB PAiD module 222, the third UHB PAiD module 223, and the fourth UHB PAiD module 224. The first PMU 201 can be used, for example, to control a power supply voltage level of the UHB PAiD modules' power amplifiers. Additionally, the first PMU 201 is also shared with the HB PAiD module 225, which transmits and receives HB signals on the first primary antenna 121 and the second primary antenna 122, and with the UL CA and MIMO module 228 used for enhancing MIMO order and a maximum number of supported carriers for carrier aggregation. Thus, the first PMU 201 provides a shared power supply voltage to the UHB PAiD modules 221-224, the HB PAiD module 225, and the UL CA and MIMO module 228, in this embodiment.

By sharing the first PMU 201 in this manner, a common power management scheme, such as fixed supply wide bandwidth average power tracking (APT), can be advantageously used for the modules.

In the illustrated embodiment, the second PMU 202 generates a shared power supply voltage used by the MB PAiD 226 and by the LB PAiD module 227.

In certain implementations, the diversity modules and diversity antennas can be located at relatively far physical distance from the RFIC 203, and connected to the RFIC 203 via cross-UE cables 271-277. Thus, the UHB PAiD modules 221-224 can be placed in remote locations around the UE phone board.

In certain embodiments herein, a PMU is shared between at least one UHB module and at least one a HB module or a MB module.

The illustrated RF system 200 of FIG. 5 advantageously includes four transmit capable UHB PAiD modules 221-224 coupled to four separate antennas 121-124, respectively, and thus both transmit and receive are equally available at each antenna for UHB communications.

Accordingly, antenna swap can be accomplished without a swap switch to redirect a trace or route. For example, antenna selection can be achieved by controlling which UHB power amplifier(s) of the UHB PAiD modules 221-224 are enabled. Similarly, with respect to receive, the antenna selection can be made by controlling which UHB low noise amplifier(s) of the UHB PAiD modules 221-224 are turned on. Thus, in this embodiment, antenna swap functionality is achieved without using any antenna swap switch.

In certain implementations, the RFIC of FIG. 5 can provide beam steering and/or different data streams through digital baseband control of a relative phase difference between signals provided to the UHB PAiD modules 221-224.

In the illustrated embodiment, the first primary antenna diplexer 204 operates to diplex between UHB frequencies and MB/HB frequencies. Additionally, the second primary antenna diplexer 205 operates to diplex between MB/HB/UHB frequencies and LB frequencies. Furthermore, the first diversity antenna triplexer 206 operates to triplex between UHB frequencies, MB/HB frequencies, and 2 GHz/5 GHz Wi-Fi frequencies. Additionally, the second diversity antenna triplexer 207 operates to triplex between UHB frequencies, LB/HB/MB frequencies, and 2 GHz/5 GHz Wi-Fi frequencies. For clarity of the figures, Wi-Fi modules connected to the first diversity antenna triplexer 206 and to the second diversity antenna triplexer 207 are not illustrated.

With continuing reference to FIG. 5, the first HB/MB diplexer 208 operates to diplex between a first group of HB frequencies (for example, Band 30 and/or Band 40) and MB frequencies. Additionally, the second HB/MB diplexer 209 operates to diplex between a second group of HB frequencies (for example, Band 7 and/or Band 41) and MB frequencies. Furthermore, the MIMO/UHB diplexer 210 operates to diplex between MB/HB frequencies and UHB frequencies. Additionally, the diversity diplexer 211 operates to diplex between MB/HB frequencies and LB frequencies.

In the illustrated embodiment, the RFIC 203 includes a first RX UHB terminal 241, a first TX UHB terminal 242, a first RX HB terminal 243, a second RX HB terminal 244, a TX HB terminal 245, a first RX MB terminal 246, a second RX MB terminal 247, a first TX MB terminal 248, a 2G TX MB terminal 249, a 2G RX MB terminal 250, a first RX LB terminal 251, a second RX LB terminal 252, a TX LB terminal 253, a second TX MB terminal 254, a third RX MB terminal 255, a fourth RX MB terminal 256, a third RX HB terminal 257, a fourth RX HB terminal 258, a second RX UHB terminal 259, a second TX UHB terminal 260, a third TX UHB terminal 261, a fourth TX UHB terminal 262, a first shared RX UHB/HB terminal 263, a second shared RX UHB/HB terminal 264, a first shared RX MB/HB terminal 265, a second shared RX MB/HB terminal 266, and a LB RX terminal 267. As shown in FIG. 5, certain terminals are shared across multiple bands to share resources and/or reduce signal routes (for instance, to use fewer cross-UE cables).

Although one embodiment of an RF system 200 is shown in FIG. 5, the teachings herein are applicable to RF systems implemented in a wide variety of ways.

Figure 6:
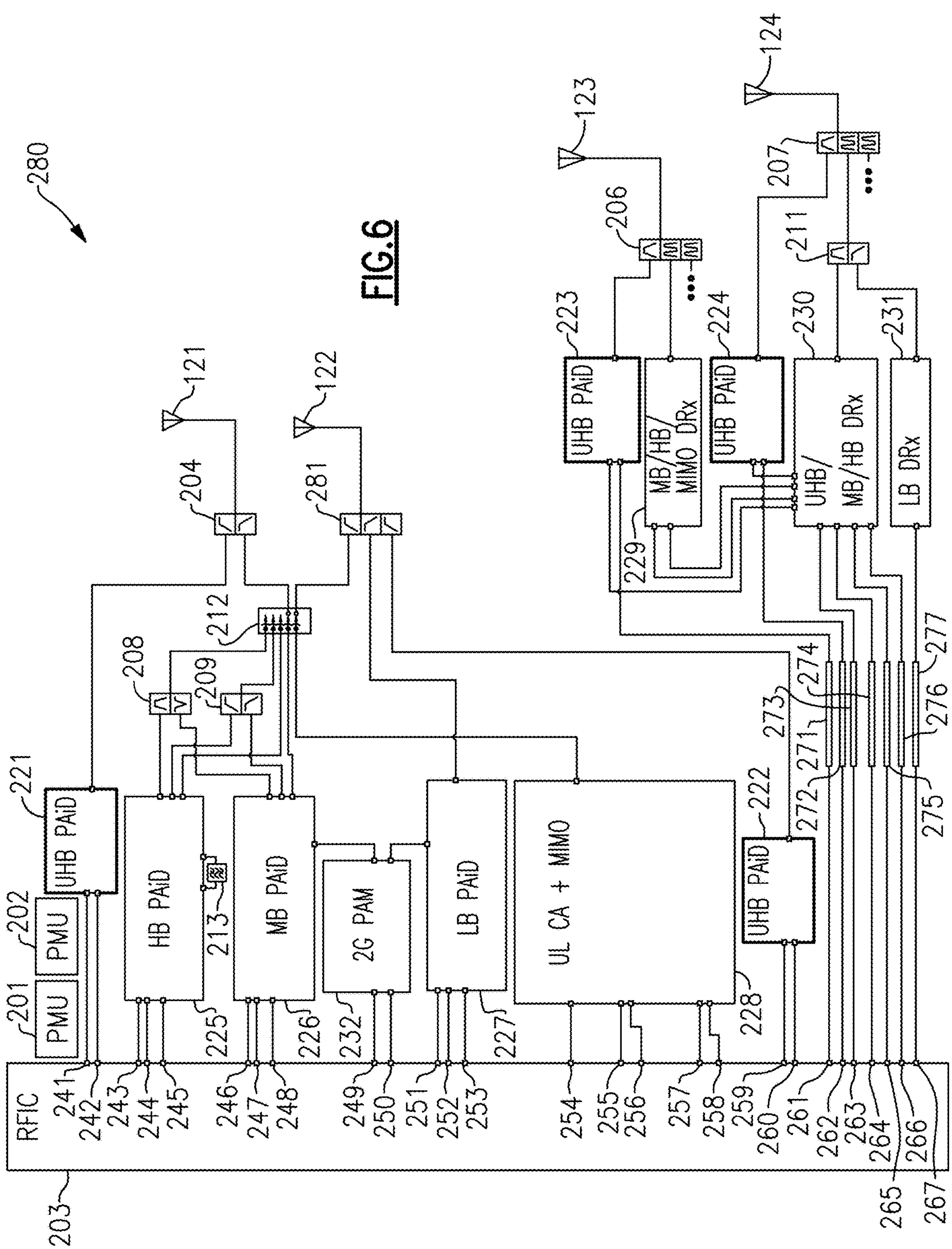
FIG. 6 is a schematic diagram of an RF system according to another embodiment.

FIG. 6 is a schematic diagram of an RF system 280 according to another embodiment. The RF system 280 includes a first primary antenna 121, a second primary antenna 122, a first diversity antenna 123, a second diversity antenna 124, a first PMU 201, a second PMU 202, an RFIC 203, a primary antenna diplexer 204, a primary antenna triplexer 281, a first diversity antenna triplexer 206, a second diversity antenna triplexer 207, a first HB/MB diplexer 208, a second HB/MB diplexer 209, a diversity diplexer 211, a multi-throw switch 212, a HB TDD filter 213, a first UHB PAiD module 221, a second UHB PAiD module 222, a third UHB PAiD module 223, a fourth UHB PAiD module 224, a HB PAiD module 225, a MB PAiD module 226, a LB PAiD module 227, an UL CA and MIMO module 228, a MB/HB MIMO DRx module 229, a UHB/MB/HB DRx module 230, a LB DRx module 231, a 2G PAM 232, and first to seventh cross-UE cables 271-277, respectively.

The RF system 280 of FIG. 6 is similar to the RF system 200 of FIG. 5, except that the RF system 280 of FIG. 6 includes the primary antenna triplexer 281 rather than the second primary antenna diplexer 205, and omits the MIMO/UHB diplexer 210 in favor of connecting the second UHB PAiD module 222 to the second primary antenna 122 by way of the primary antenna triplexer 281.

Implementing the RF system 280 in this manner connects the second UHB PAiD module 222 to the second primary antenna 122 with lower loss relative to the embodiment of FIG. 5. Thus, the RF system 280 of FIG. 6 has lower insertion loss for certain UHB signal paths, which can enhance the performance of certain CA combinations and/or when operating using UHB MIMO communications.

Figure 7A:
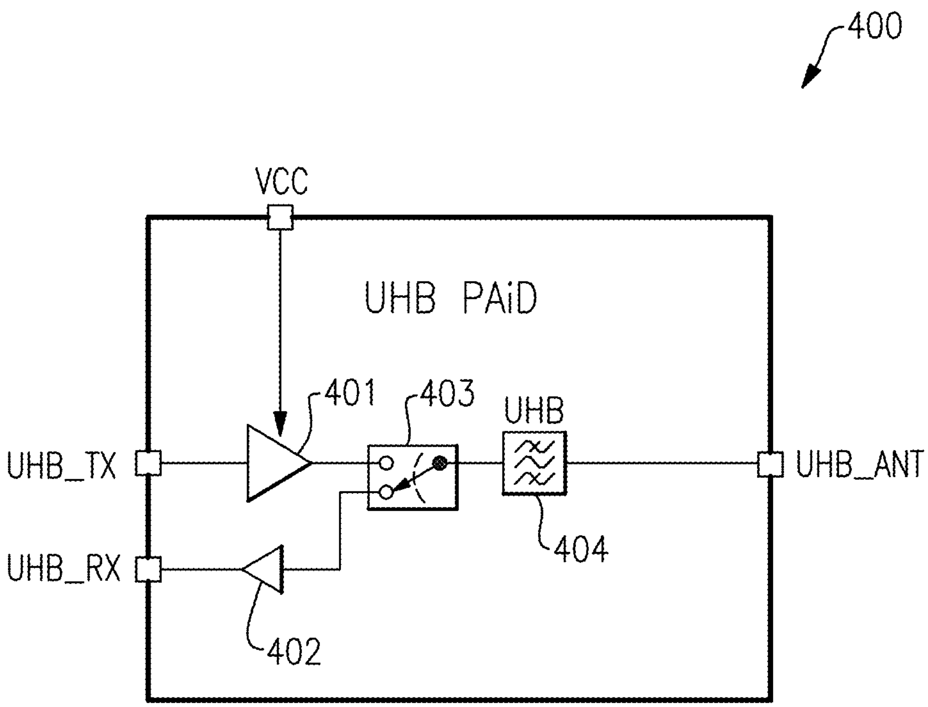
FIG. 7A is a schematic diagram of an ultrahigh band (UHB) transmit and receive module according to one embodiment.

FIG. 7A is a schematic diagram of a UHB transmit and receive module 400 according to one embodiment. The UHB transmit and receive module 400 operates to generate a UHB signal for transmission and to process a UHB signal received from an antenna.

The UHB transmit and receive module 400 illustrates one implementation of a UHB module suitable for incorporation in a RF system, such as any of the RF systems of FIGS. 4A-6. Although the UHB transmit and receive module 400 illustrates one implementation of a UHB module, the teachings herein are applicable to RF electronics including UHB modules implemented in a wide variety of ways. Accordingly, other implementations of UHB modules are possible, such as UHB modules with more or fewer pins, different pins, more or fewer components, and/or a different arrangement of components.

The UHB transmit and receive module 400 includes a power amplifier 401, a low noise amplifier 402, a transmit/receive switch 403, and a UHB filter 404, which is used to pass one or more UHB bands, for instance, Band 42, Band 43, and/or Band 48. The UHB transmit and receive module 400 further includes a variety of pins, including a UHB_TX pin for receiving a UHB transmit signal for transmission, a UHB_RX pin for outputting a UHB receive signal, a UHB_ANT pin for connecting to an antenna, and a VCC pin for receiving a supply voltage for powering at least the power amplifier 401. In certain implementations, the VCC pin receives a shared supply voltage from a power management circuit (for example, a PMU) shared by multiple modules.

The illustrated UHB transmit and receive module 400 provides both transmit and receive functionality for UHB signals. Thus, when four instantiations of the UHB transmit and receive module 400 are coupled directly or indirectly to four antennas, both 4×4 RX MIMO for UHB and 4×4 TX MIMO for UHB can be achieved. Additionally, the UHB transmit and receive modules can be used to support carrier aggregation for UL and/or DL using one or more UHB carrier frequencies.

Figure 7B:
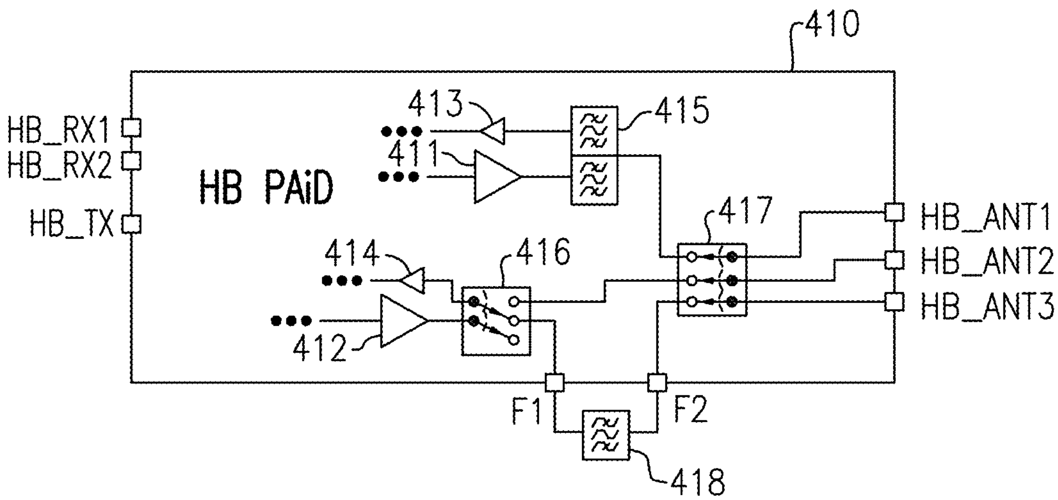
FIG. 7B is a schematic diagram of a high band (HB) transmit and receive module according to one embodiment.

FIG. 7B is a schematic diagram of a HB transmit and receive module 410 according to one embodiment.

The RF systems disclosed herein can include one or more instantiations of the HB transmit and receive module 410. Although the HB transmit and receive module 410 illustrates one implementation of a HB module, the teachings herein are applicable to RF electronics including HB modules implemented in a wide variety of ways as well as to RF electronics implemented without HB modules.

The HB transmit and receive module 410 includes a first power amplifier 411 for FDD communications, a second power amplifier 412 for TDD communications, a first low noise amplifier 413 for FDD communications, a second low noise amplifier 414 for TDD communications, a FDD duplexer 415, a transmit/receive switch 416, and a multi-throw switch 417. An external TDD filter 418 is also included in this embodiment. In another embodiment, the TDD filter 418 is included within the module 410.

The HB transmit and receive module 410 further includes a variety of pins, including a HB_TX pin for receiving a HB transmit signal for transmission, a HB_RX1 pin for outputting a first HB receive signal, a HB_RX2 pin for outputting a second HB receive signal, a F1 pin for connecting to one terminal of the external TDD filter 418, and a F2 pin for connecting to another terminal of the external TDD filter 418. The module 410 further includes a HB_ANT1 pin, a HB_ANT2 pin, and a HB_ANT3 pin for connecting to one or more antennas.

Figure 7C:
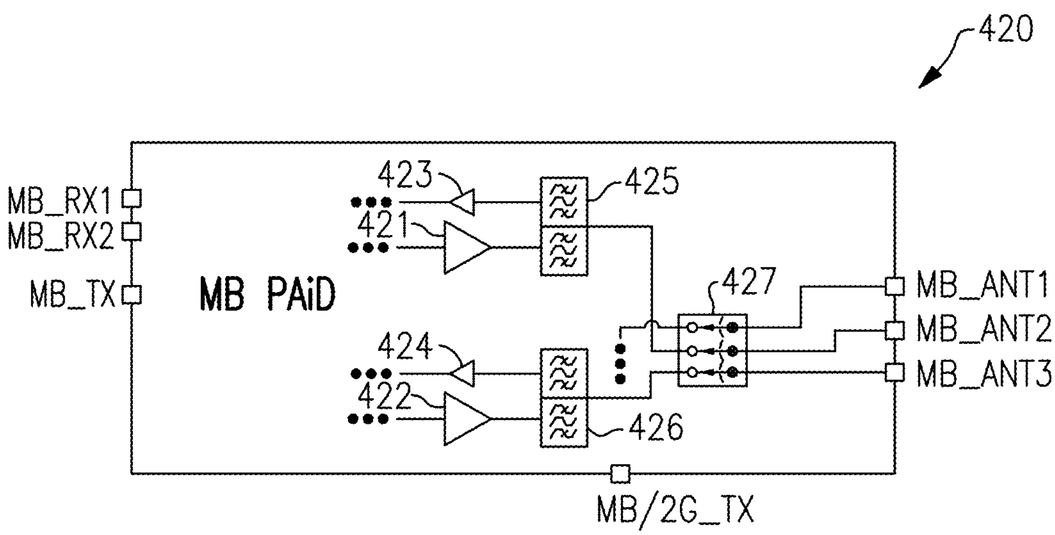
FIG. 7C is a schematic diagram of a mid band (MB) transmit and receive module according to one embodiment.

FIG. 7C is a schematic diagram of a MB transmit and receive module 420 according to one embodiment.

The RF systems disclosed herein can include one or more instantiations of the MB transmit and receive module 420. Although the MB transmit and receive module 420 illustrates one implementation of a MB module, the teachings herein are applicable to RF electronics including MB modules implemented in a wide variety of ways as well as to RF electronics implemented without MB modules.

The MB transmit and receive module 420 includes a first power amplifier 421, a second power amplifier 422, a first low noise amplifier 423, a second low noise amplifier 424, a first duplexer 425, a second duplexer 426, and a multi-throw switch 427. In certain implementations, the first duplexer 425 and the second duplexer 426 provide duplexing to different MB frequency bands. In one example, the first duplexer 425 is operable to duplex Band 3, while the second duplexer 426 is operable to duplex Band 1 and/or Band 66.

The MB transmit and receive module 420 further includes a variety of pins, including a MB_TX pin for receiving a MB transmit signal for transmission, a MB_RX1 pin for outputting a first MB receive signal, a MB_RX2 pin for outputting a second MB receive signal, and a MB/2G_TX pin for receiving a 2G transmit signal for transmission. The module 420 further includes a MB_ANT1 pin, a MB_ANT2 pin, and a MB_ANT3 pin for connecting to one or more antennas.

Figure 7D:
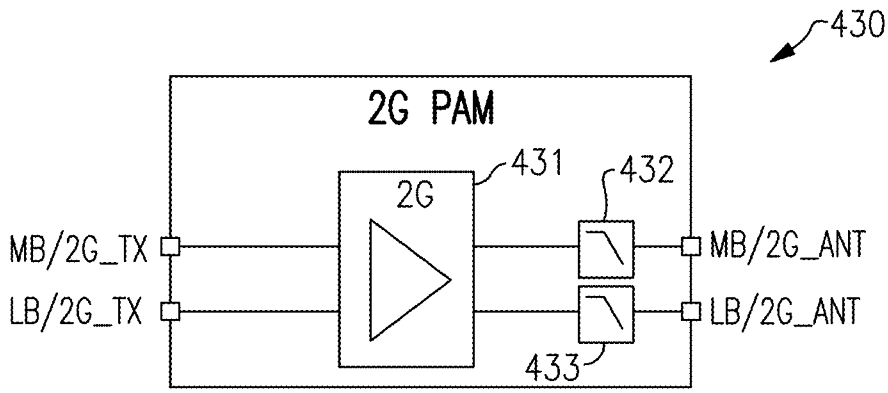
FIG. 7D is a schematic diagram of a 2G power amplifier module according to one embodiment.

FIG. 7D is a schematic diagram of a 2G power amplifier module (PAM) 430 according to one embodiment.

The RF systems disclosed herein can include one or more instantiations of the 2G PAM 430. Although the 2G PAM 430 illustrates one implementation of a 2G module, the teachings herein are applicable to RF electronics including 2G modules implemented in a wide variety of ways as well as to RF electronics implemented without 2G modules.

The 2G PAM 430 includes power amplifier circuitry 431, a MB 2G filter 432, and a LB 2G filter 433. The 2G PAM 430 further includes a variety of pins, including a MB/2G_TX pin for receiving a 2G MB transmit signal for transmission and a LB/2G_TX pin for receiving a 2G LB transmit signal for transmission. The module 430 further includes a MB/2G_ANT pin and a LB/2G_ANT pin for connecting to one or more antennas.

Figure 7E:
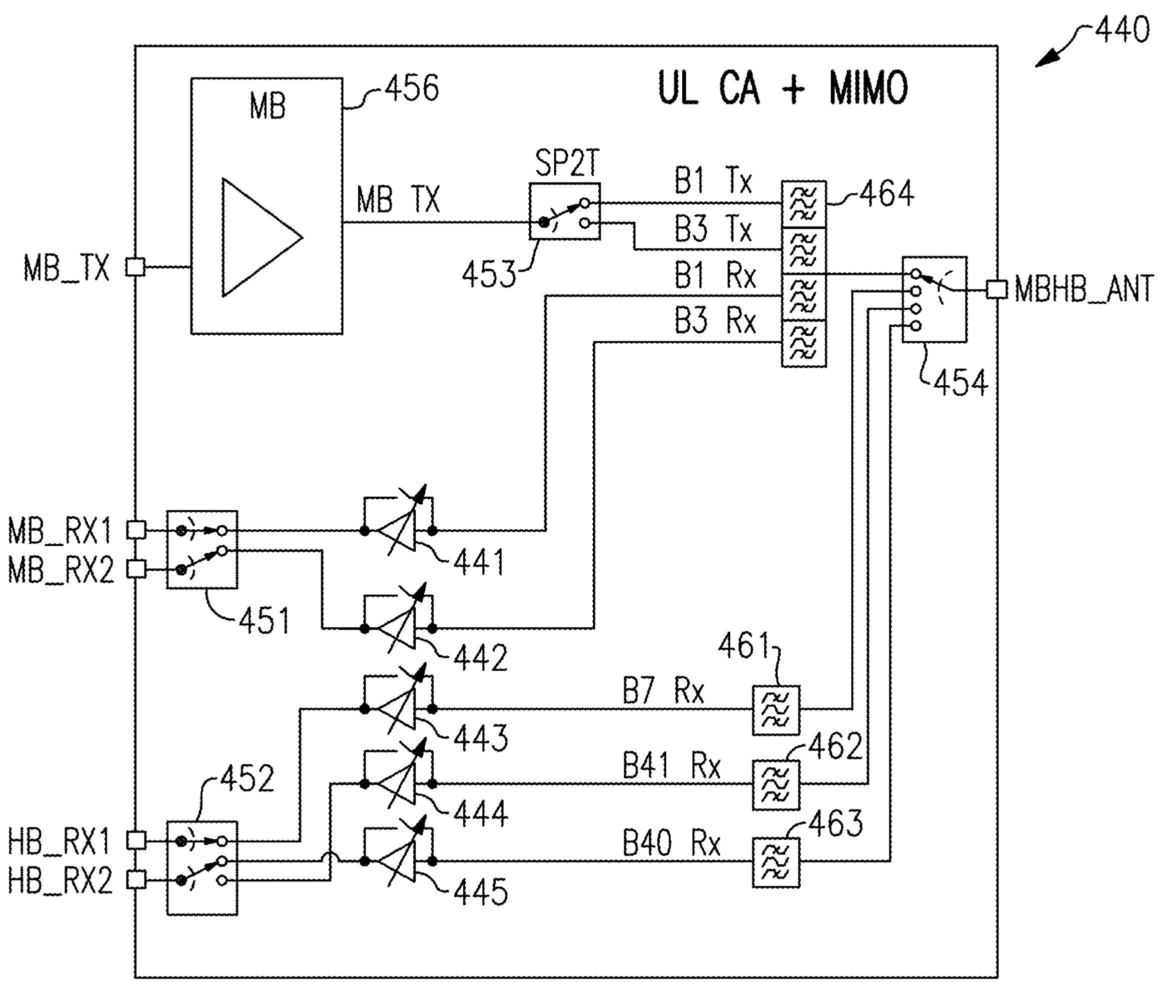
FIG. 7E is a schematic diagram of an uplink carrier aggregation and MIMO module according to one embodiment.

FIG. 7E is a schematic diagram of an uplink carrier aggregation and MIMO (UL CA+MIMO) module 440 according to one embodiment.

The RF systems disclosed herein can include one or more instantiations of the UL CA+MIMO module 440. Although the UL CA+MIMO module 440 illustrates one implementation of a CA/MIMO module, the teachings herein are applicable to RF electronics including CA/MIMO modules implemented in a wide variety of ways as well as to RF electronics implemented without CA/MIMO modules.

The UL CA+MIMO module 440 includes MB power amplifier circuitry 456, a MB transmit selection switch 453, a MB quadplexer 464, a multi-throw switch 454, a first HB receive filter 461, a second HB receive filter 462, a third HB receive filter 463, a MB receive selection switch 451, a HB receive selection switch 452, a first HB low noise amplifier 441 (with bypass and gain control functionality, in this embodiment), a second HB low noise amplifier 442, a third HB low noise amplifier 443, a fourth HB low noise amplifier 444, and a fifth HB low noise amplifier 445. The UL CA+MIMO module 440 is annotated to show example frequency bands for operation, including Band 1 and Band 3 for MB and Band 7, Band 40, and Band 41 for HB. However, the UL CA+MIMO module 440 can be implemented to operate with other MB frequency bands and/or HB frequency bands.

The UL CA+MIMO module 440 further includes a variety of pins, including a MB_TX pin for receiving a MB transmit signal for transmission, a MB_RX1 pin for outputting a first MB receive signal, a MB_RX2 pin for outputting a second MB receive signal, a HB_RX1 pin for outputting a first HB receive signal, a HB_RX2 pin for outputting a second HB receive signal, and a MBHB_ANT pin for connecting to an antenna.

Figure 8A:
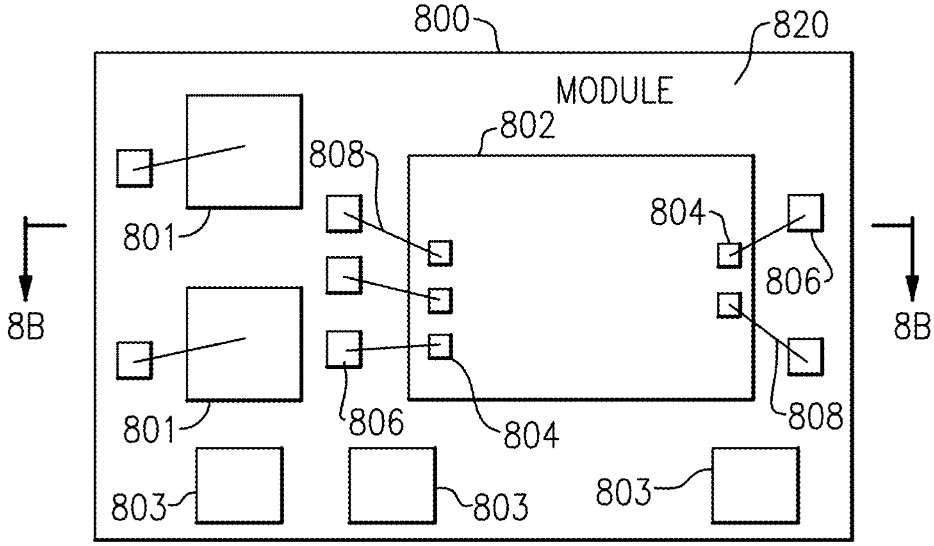
FIG. 8A is a schematic diagram of one embodiment of a packaged module.
Figure 8B:
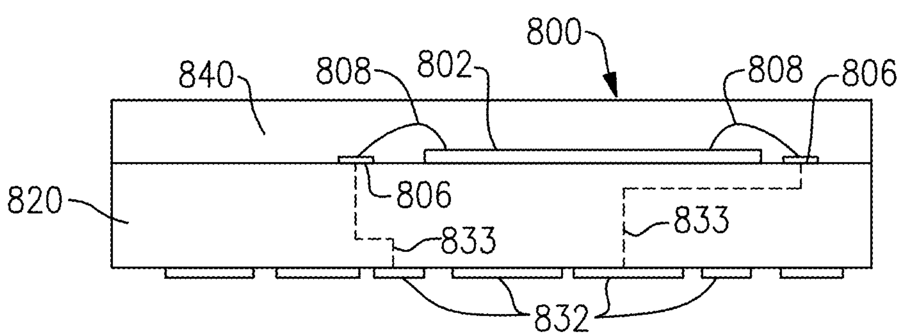
FIG. 8B is a schematic diagram of a cross-section of the packaged module of FIG. 8A taken along the lines 8B-8B.

FIG. 8A is a schematic diagram of one embodiment of a packaged module 800. FIG. 8B is a schematic diagram of a cross-section of the packaged module 800 of FIG. 8A taken along the lines 8B-8B.

The RFFE systems herein can include one or more packaged modules, such as the packaged module 800. Although the packaged module 800 of FIGS. 8A-8B illustrates one example implementation of a module suitable for use in an RFFE system, the teachings herein are applicable to modules implemented in other ways.

The packaged module 800 includes radio frequency components 801, a semiconductor die 802, surface mount devices 803, wirebonds 808, a package substrate 820, and encapsulation structure 840. The package substrate 820 includes pads 806 formed from conductors disposed therein. Additionally, the semiconductor die 802 includes pins or pads 804, and the wirebonds 808 have been used to connect the pads 804 of the die 802 to the pads 806 of the package substrate 820.

As shown in FIG. 8B, the packaged module 800 is shown to include a plurality of contact pads 832 disposed on the side of the packaged module 800 opposite the side used to mount the semiconductor die 802. Configuring the packaged module 800 in this manner can aid in connecting the packaged module 800 to a circuit board, such as a phone board of a wireless device. The example contact pads 832 can be configured to provide radio frequency signals, bias signals, and/or power (for example, a power supply voltage and ground) to the semiconductor die 802. As shown in FIG. 8B, the electrical connections between the contact pads 832 and the semiconductor die 802 can be facilitated by connections 833 through the package substrate 820. The connections 833 can represent electrical paths formed through the package substrate 820, such as connections associated with vias and conductors of a multilayer laminated package substrate.

In some embodiments, the packaged module 800 can also include one or more packaging structures to, for example, provide protection and/or facilitate handling. Such a packaging structure can include overmold or encapsulation structure 840 formed over the packaging substrate 820 and the components and die(s) disposed thereon.

It will be understood that although the packaged module 800 is described in the context of electrical connections based on wirebonds, one or more features of the present disclosure can also be implemented in other packaging configurations, including, for example, flip-chip configurations.

Figure 9:
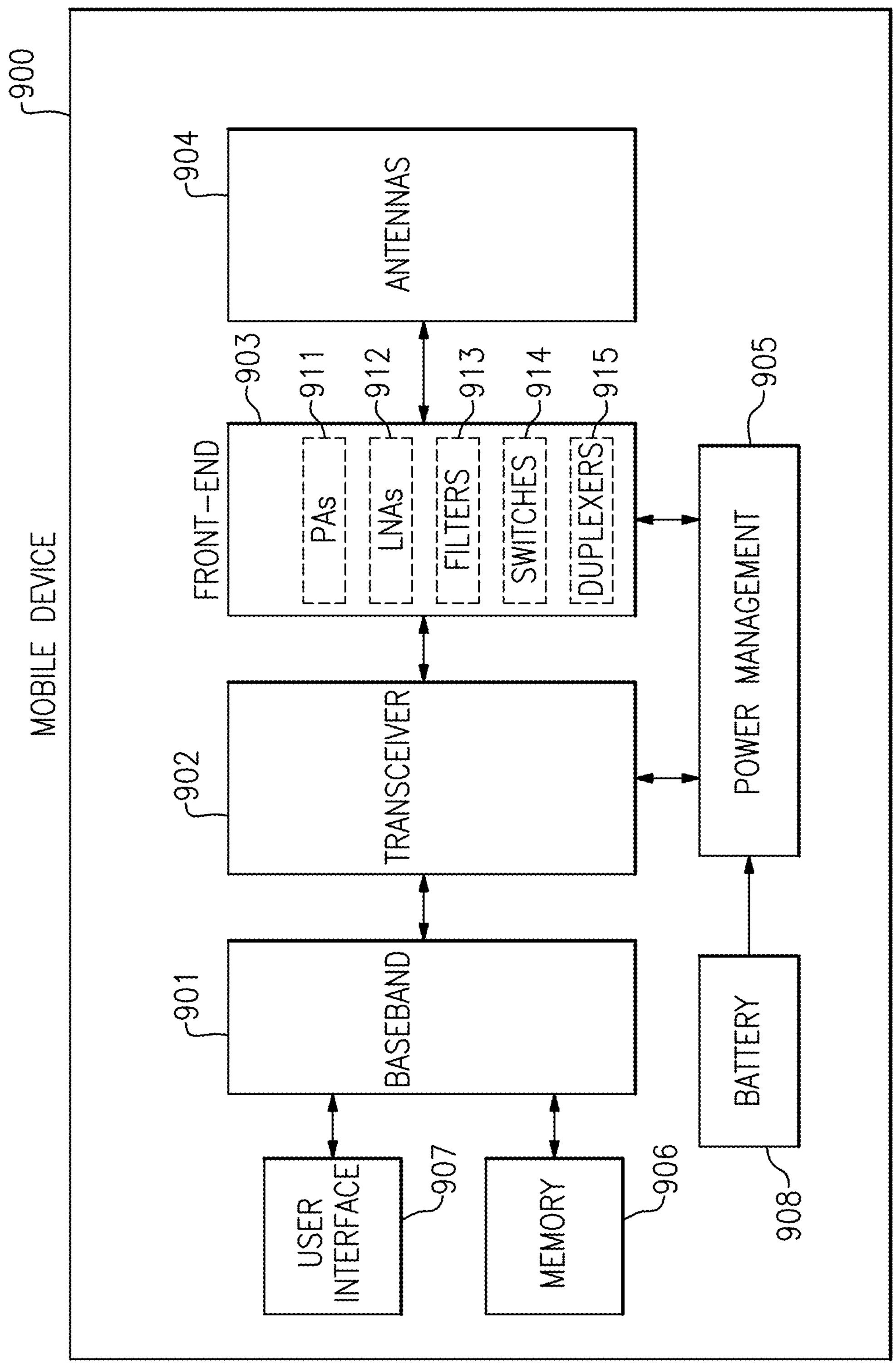
FIG. 9 is a schematic diagram of one embodiment of a mobile device.

FIG. 9 is a schematic diagram of one embodiment of a mobile device 900. The mobile device 900 includes a baseband system 901, a transceiver 902, a front-end system 903, antennas 904, a power management system 905, a memory 906, a user interface 907, and a battery 908.

The mobile device 900 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), WMAN (for instance, WiMax), and/or GPS technologies.

The transceiver 902 generates RF signals for transmission and processes incoming RF signals received from the antennas 904.

The front-end system 903 aids is conditioning signals transmitted to and/or received from the antennas 904. In the illustrated embodiment, the front-end system 903 includes power amplifiers (PAs) 911, low noise amplifiers (LNAs) 912, filters 913, switches 914, and duplexers 915. However, other implementations are possible.

For example, the front-end system 903 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 900 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 904 can include antennas used for a wide variety of types of communications. For example, the antennas 904 can include antennas for transmitting and/or receiving signals associated with a wide variety of frequencies and communications standards.

In certain implementations, the antennas 904 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 900 can operate with beamforming in certain implementations. For example, the front-end system 903 can include phase shifters having variable phase controlled by the transceiver 902. Additionally, the phase shifters are controlled to provide beam formation and directivity for transmission and/or reception of signals using the antennas 904. For example, in the context of signal transmission, the phases of the transmit signals provided to the antennas 904 are controlled such that radiated signals from the antennas 904 combine using constructive and destructive interference to generate an aggregate transmit signal exhibiting beam-like qualities with more signal strength propagating in a given direction. In the context of signal reception, the phases are controlled such that more signal energy is received when the signal is arriving to the antennas 904 from a particular direction. In certain implementations, the antennas 904 include one or more arrays of antenna elements to enhance beamforming.

The baseband system 901 is coupled to the user interface 907 to facilitate processing of various user input and output (I/O), such as voice and data. The baseband system 901 provides the transceiver 902 with digital representations of transmit signals, which the transceiver 902 processes to generate RF signals for transmission. The baseband system 901 also processes digital representations of received signals provided by the transceiver 902. As shown in FIG. 9, the baseband system 901 is coupled to the memory 906 of facilitate operation of the mobile device 900.

The memory 906 can be used for a wide variety of purposes, such as storing data and/or instructions to facilitate the operation of the mobile device 900 and/or to provide storage of user information.

The power management system 905 provides a number of power management functions of the mobile device 900. In certain implementations, the power management system 905 includes a PA supply control circuit that controls the supply voltages of the power amplifiers 911. For example, the power management system 905 can be configured to change the supply voltage(s) provided to one or more of the power amplifiers 911 to improve efficiency, such as power added efficiency (PAE).

As shown in FIG. 9, the power management system 905 receives a battery voltage from the battery 908. The battery 908 can be any suitable battery for use in the mobile device 900, including, for example, a lithium-ion battery.

The front-end system 903 of FIG. 9 can be implemented in accordance with one or more features of the present disclosure. Although the mobile device 900 illustrates one example of an RF communication device that can include an RFFE system implemented in accordance with the present disclosure, the teachings herein are applicable to a wide variety of RF electronics.

Applications

Some of the embodiments described above have provided examples in connection with mobile devices. However, the principles and advantages of the embodiments can be used for any other systems or apparatus that have needs for filter bypass. Examples of such RF communication systems include, but are not limited to, mobile phones, tablets, base stations, network access points, customer-premises equipment (CPE), laptops, and wearable electronics.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A wireless device comprising:

a transceiver; and a radio frequency front end system coupled to the transceiver, the radio frequency front end system including a first module that includes a first power amplifier configured to amplify a first ultrahigh band transmit signal, a second module that includes a second power amplifier configured to amplify a second ultrahigh band transmit signal, a third module that includes a third power amplifier configured to amplify a third ultrahigh band transmit signal, a fourth module that includes a fourth power amplifier configured to amplify a fourth ultrahigh band transmit signal, and a shared power management circuit configured to output a common power amplifier supply voltage that powers the first power amplifier, the second power amplifier, the third power amplifier, and the fourth power amplifier, the first module, the second module, the third module, and the fourth module operable to support uplink carrier aggregation for one or more ultrahigh frequency carriers.

2. The wireless device of claim 1 wherein the first ultrahigh band transmit signal, the second ultrahigh band transmit signal, the third ultrahigh band transmit signal, and the fourth ultrahigh band transmit signal each have a frequency content between about 3 gigahertz and about 6 gigahertz.

3. The wireless device of claim 1 further comprising a plurality of antennas including a first antenna coupled to an output of the first power amplifier, a second antenna coupled to an output of the second power amplifier, a third antenna coupled to an output of the third power amplifier, and a fourth antenna coupled to an output of the fourth power amplifier.

4. The wireless device of claim 1 wherein the radio frequency front end system further includes a high band module that includes a fifth power amplifier configured to amplify a high band transmit signal having a frequency content between 2.3 gigahertz and 3 gigahertz, the common power amplifier supply voltage further operable to power the fifth power amplifier.

5. The wireless device of claim 1 wherein the first module, the second module, third module, and the fourth module are each configured to process a respective ultrahigh band receive signal.

6. The wireless device of claim 1 wherein the transceiver provides the first ultrahigh band transmit signal, the second ultrahigh band transmit signal, the third ultrahigh band transmit signal, and the fourth ultrahigh band transmit signal to the radio frequency front end system.

7. The wireless device of claim 1 wherein the shared power management circuit is configured to control the common power amplifier supply voltage using average power tracking.

8. The wireless device of claim 1 wherein the first module, the second module, the third module, and the fourth module operate to support four-by-four (4×4) uplink multi-input and multi-output (MIMO) communications using Band 42.

9. The wireless device of claim 1 wherein the first module, the second module, the third module, and the fourth module operate to support four-by-four (4×4) uplink multi-input and multi-output (MIMO) communications using Band 43.

10. A wireless device comprising:

a transceiver;

a radio frequency front end system coupled to the transceiver, the radio frequency front end system including a first module that includes a first power amplifier configured to amplify a first ultrahigh band transmit signal, a second module that includes a second power amplifier configured to amplify a second ultrahigh band transmit signal, a third module that includes a third power amplifier configured to amplify a third ultrahigh band transmit signal, a fourth module that includes a fourth power amplifier configured to amplify a fourth ultrahigh band transmit signal, and a shared power management circuit configured to output a common power amplifier supply voltage that powers the first power amplifier, the second power amplifier, the third power amplifier, and the fourth power amplifier, the first module, the second module, the third module, and the fourth module operable to provide antenna swapping for one or more ultrahigh frequency bands without any antenna swap switch; and a plurality of antennas including a first antenna coupled to an output of the first power amplifier, a second antenna coupled to an output of the second power amplifier, a third antenna coupled to an output of the third power amplifier, and a fourth antenna coupled to an output of the fourth power amplifier.

11. The wireless device of claim 10 wherein the first ultrahigh band transmit signal, the second ultrahigh band transmit signal, the third ultrahigh band transmit signal, and the fourth ultrahigh band transmit signal each have a frequency content between about 3 gigahertz and about 6 gigahertz.

12. The wireless device of claim 11 wherein the radio frequency front end system further includes a high band module that includes a fifth power amplifier configured to amplify a high band transmit signal having a frequency content between 2.3 gigahertz and 3 gigahertz, the common power amplifier supply voltage further operable to power the fifth power amplifier.

13. A wireless device comprising:

a transceiver;

a radio frequency front end system coupled to the transceiver, the radio frequency front end system including a first module that includes a first power amplifier configured to amplify a first ultrahigh band transmit signal, a second module that includes a second power amplifier configured to amplify a second ultrahigh band transmit signal, a third module that includes a third power amplifier configured to amplify a third ultrahigh band transmit signal, a fourth module that includes a fourth power amplifier configured to amplify a fourth ultrahigh band transmit signal, and a shared power management circuit configured to output a common power amplifier supply voltage that powers the first power amplifier, the second power amplifier, the third power amplifier, and the fourth power amplifier; and a plurality of antennas including a first antenna coupled to an output of the first power amplifier, a second antenna coupled to an output of the second power amplifier, a third antenna coupled to an output of the third power amplifier, and a fourth antenna coupled to an output of the fourth power amplifier, the first antenna and the second antenna being primary antennas on a first side of the wireless device, and the third antenna and the fourth antenna being diversity antennas on a second side of the wireless device.

14. The wireless device of claim 13 wherein the first ultrahigh band transmit signal, the second ultrahigh band transmit signal, the third ultrahigh band transmit signal, and the fourth ultrahigh band transmit signal each have a frequency content between about 3 gigahertz and about 6 gigahertz.

15. The wireless device of claim 14 wherein the radio frequency front end system further includes a high band module that includes a fifth power amplifier configured to amplify a high band transmit signal having a frequency content between 2.3 gigahertz and 3 gigahertz, the common power amplifier supply voltage further operable to power the fifth power amplifier.

16. A radio frequency front end system comprising:

a first module including a first power amplifier configured to amplify a first ultrahigh band transmit signal;

a second module including a second power amplifier configured to amplify a second ultrahigh band transmit signal;

a third module including a third power amplifier configured to amplify a third ultrahigh band transmit signal;

a fourth module including a fourth power amplifier configured to amplify a fourth ultrahigh band transmit signal, the first module, the second module, the third module, and the fourth module operable to support uplink carrier aggregation for one or more ultrahigh frequency carriers; and a shared power management circuit configured to output a common power amplifier supply voltage that powers the first power amplifier, the second power amplifier, the third power amplifier, and the fourth power amplifier.

17. The radio frequency front end system of claim 16 wherein the first ultrahigh band transmit signal, the second ultrahigh band transmit signal, the third ultrahigh band transmit signal, and the fourth ultrahigh band transmit signal each have a frequency content between about 3 gigahertz and about 6 gigahertz.

18. The radio frequency front end system of claim 16 further comprising a high band module that includes a fifth power amplifier configured to amplify a high band transmit signal having a frequency content between 2.3 gigahertz and 3 gigahertz, the common power amplifier supply voltage further operable to power the fifth power amplifier.

19. The radio frequency front end system of claim 16 wherein the first module, the second module, third module, and the fourth module are each configured to process a respective ultrahigh band receive signal.

20. The radio frequency front end system of claim 16 wherein the shared power management circuit is configured to control the common power amplifier supply voltage using average power tracking.

* * * * *